THERMAL DEPOLYMERIZATION (ISOTHERMAL)
CURVES FOR POLYPROPYLENE AND POLYISOBUTYLENE
PRESSURE VS TIME

I - HEXENE-1 POLYMER PRODUCED AT 170° F
II- POLYISOBUTYLENE (COMMERCIAL)
III- HEXENE-1 POLYMER PRODUCED AT 215° F
✶ - EXPERIMENTAL POINT FOR II

VARIATION IN VISCOSITY AT 210° F WITH VI

2,825,721

POLYMERS AND PRODUCTION THEREOF

John Paul Hogan and Robert L. Banks, Bartlesville, Okla., assignors to Phillips Petroleum Company, a corporation of Delaware Application March 26, 1956, Serial No. 573,877

44 Claims. (Cl. 260—88.1)

This invention relates to the polymerization of olefins. In one aspect, it relates to a novel polymerization catalyst and a method of manufacturing the catalyst. In another aspect, it relates to unique polymers.

This application is a continuation-in-part of our copending applications Serial No. 333,576, filed January 27, 1953, and Serial No. 476,306, filed December 20, 1954, both of said applications now abandoned.

It is known that propylene and other low-boiling monoalkylethylenes can be polymerized in the presence of metal halide catalysts to produce polymer products of different viscosities within the lubricating oil range. Polymer products having improved viscosity characteristics have also been obtained by polymerizing monoalkylethylenes in the presence of dissolved aluminum bromide catalyst and catalyst promoter, such as hydrogen bromide, under conditions conducive to maximum growth of polymer chains. By this process, propylene polymer products in 100 percent yield, having a viscosity at 210° F. of 15,000 S. U. S., or higher viscosities which cannot be measured, have been obtained. More particularly, the desired polymer products are obtained by admixing monoalkylethylenes and aluminum bromide solution in the presence of hydrogen bromide to produce a polymerization reaction mixture as a first step, and thereafter, as a second step, adding monoalkylethylene slowly to the polymerization reaction mixture. The two-step process produced polymer products of higher viscosity than were obtainable by processes previously employed. Prior to this invention, the polymerization of olefins to tacky and solid polymers had not been catalyzed by a highly oxidized metal oxide as the essential catalyst ingredient, even though metal oxide catalysts had been used in catalyzing the polymerization of olefins to liquid polymers, such as propylene dimer and tetramer.

The objects of the invention are several:

To provide a process for polymerizing olefins in contact with novel catalysts;

To provide novel solid polymers;

To provide a process for polymerizing 1-olefins having a maximum of 8 carbon atoms and no branching nearer the double bond than the 4-position to tacky, semi-solid, and solid polymer;

To provide novel polymers of high molecular weight from 1-olefins of the character described;

To provide novel catalysts for olefin polymerization;

To provide a novel method of preparing such catalysts which are particularly active in polymerizing 1-olefins of the character described to tacky, semi-solid, and solid polymer; and To produce high molecular weight polymers which are improved VI improvers from certain 1-olefins.

Other objects of the invention will become apparent from a consideration of this disclosure.

In accordance with this invention, polymers, including novel tacky polymeric products and/or solid polymers, are obtained by polymerizing polymerizable olefinic compounds in the presence of chromium oxide associated with at least one oxide selected from the group consisting of silica, alumina, zirconia, and thoria. Solid polymers can be produced from monoolefins and from diolefins. Chromium oxide is an essential catalytic ingredient for the production of high molecular weight tacky and/or solid polymers according to this invention. This catalyst comprising chromium oxide is highly active in polymerizing certain olefins to these heavy polymers. However, its capacity to polymerize olefins to maximum yields of tacky and/or solid polymers appears to be highest in connection with 1-olefins having a maximum of 8 carbon atoms and no branching nearer the double bond than the 4-position. It does polymerize olefins other than those mentioned, but the polymers are preponderantly normally liquid. While the ensuing description deals principally with liquid-phase operation, vapor-phase operation, without a diluent, or with a diluent in liquid phase (so-called "mixed-phase" operation), is effective in producing tacky and/or solid polymer.

Diolefins, e. g., butadiene and isoprene, are among the 1-olefins polymerized to solid polymers over our chromium oxide catalyst. In the case of conjugated diolefins, a methyl group can be closer to a double bond than the 4-position. The diolefin must have at least one terminal double bond. Conjugated diolefins can have small substituents, e. g., $CH_3$, $C_2H_5$, as close as the 3-position to the terminal double bond. Nonconjugated diolefins exhibit the same characteristics as 1-olefins in our process.

The unique polymers according to this invention are characterized by the fact that their unsaturation is preponderantly of the trans-internal or terminal vinyl type. Certain of them are characterized in that their unsaturation is almost entirely of the terminal vinyl structure.

Throughout the specification, it is to be understood that the term "total polymer" as applied to polymers of propylene, designates all polymer boiling above the monomer (but not including any diluent, of course); the semi-solid polymer constitutes the mixture or residuum remaining after distilling off, or otherwise removing, the light oil boiling below about 900° F.; the tacky polymer is the lower molecular weight portion of the semi-solid polymer, which portion can be extracted therefrom with n-pentane at room temperature; and the solid polymer is the higher molecular weight portion of the semi-solid fraction, which constitutes the raffinate or insoluble portion left from the extraction with n-pentane or methylisobutylketone (MIBK). Ethylene polymers according to this invention are composed preponderantly of normally solid material; only small amounts of tacky or liquid polymer are ordinarily produced from ethylene. Polymers of 1-butene, of 1-pentene, and of 4-methyl-1-pentene according to this invention are similar to those of propylene. It will be readily understood by those skilled in the art, however, that the molecular weight distribution in any given polymer will depend upon, not only the polymerization conditions, but the nature of the monomer employed. Thus 1-hexene, 1-heptene and 1-octene ordinarily give relatively low yields of normally solid polymer and relatively high yields of semi-solid, highly viscous, or tacky polymer. However, 4-methyl-1-pentene produces higher yields of solid polymer than does 1-hexene or 1-pentene.

The polymerization of propylene over the catalyst according to this invention yields a total polymer product of about 2000 to 50,000 average molecular weight. The molecular weight of narrow fractions of the polypropylene produced by the process of this invention in the presence of chromium oxide supported on silica, alumina, or silica-alumina range from about 200 to 100,000 or higher. Our polypropylene ordinarily contains about 10 to 20 weight percent of material boiling below 900° F. This fraction is an oil having an initial boiling point of about 400° F. The fraction boiling above 900° F. contains both tacky and solid polymer.

The tacky polymer product is useful in the manufacturing of surgical and pressure sensitive tapes, calking and sealing compounds, laminated paper, hydraulic fluids, tracing peper, electrical capacitors, surface coatings, rubber extenders, etc. Certain fractions of the polymer products are particularly useful as lubricating oil and as VI improvers and blending materials for lubricating oils. The solid polymers and copolymers of the invention have utility in applications where solid plastics are used. They can be coated on wire to provide insulation. They can be extruded to form filaments. They can be molded to form articles of any desired shape, for example, bottles and other containers for liquids. They are particularly desirable in these applications on account of their relatively high softening points which make them amenable to sterilization with superheated steam without deformation. They can also be formed into pipe or tubing by extrusion.

The catalyst according to this invention can be prepared by preparation methods known in the art, e. g. direct mixing of solid components, impregnation, etc. In order to obtain optimum activity, it is preferred that the catalyst mixture comprising chromium oxide and the additional oxide as hereinbefore specified be heated under elevated temperature and for a sufficient time to activate, or increase the activity of, said catalyst for the polymerization reaction. It is also preferred that the catalyst be heated under nonreducing conditions in an atmosphere such as oxygen, air, nitrogen, carbon dioxide, helium, argon, krypton, or xenon. Reducing gases such as hydrogen or carbon monoxide can be present in said atmosphere where the time of contact with the catalyst, especially at the higher temperatures, is limited to prevent extensive reduction of the hexavalent chromium; however, the presence of such gases, and of reducing agents in general, is ordinarily not desired. It is ordinarily preferred that the activation atmosphere be nonreducing. It is further preferred that the atmosphere be positively oxidixing, e. g. air or oxygen. The temperature and time of activation can vary over wide ranges and are closely interrelated (so-called "time-temperature effect"), longer times being required at lower temperatures and shorter times at higher temperatures. Catalysts prepared by milling solid silica, alumina, zirconia and/or thoria with solid oxide are activatable at lower temperatures than are catalysts prepared by impregnating silica, alumina, zirconia and/or thoria with an aqueous solution of a chromium compound. As a practical matter, a catalyst prepared by dry mixing is ordinarily activated at a temperature of at least about 350° F. and not substantially greater than about 1500° F. A catalyst prepared by impregnation with an aqueous solution is ordinarily activated at a temperature of at least about 450° F. and not substantially greater than 1500° F. Times of activation can range from about a second at the highest temperatures to 50 hours or more at the lowest temperatures. The stated numerical values are given as illustrative of the most practical ranges and are not absolute limits. By using very short times and higher temperatures, or very long times and lower temperatures, catalysts having various degrees of increased activation are obtainable.

The chromium oxide catalyst can be prepared by impregnation of particulate silica, alumina, or silica-alumina, for example, with a solution of chromium oxide or a compound convertible to chromium oxide by calcination, followed by drying and activation of the composite at a temperature in the range of 450 to 1500° F., preferably 750 to 1500° F., for a period of 3 to 10 hours or more. Activation is conducted by heating in a stream of gas. It is preferred that the gas contain oxygen and be substantially water-free. Preferably the dew point of the activation gas should be below 75° F., preferably below 0° F. However, inert gases, such as carbon dioxide and nitrogen, can be used. It is found that within this activation range of temperature treatment of the catalyst, the character of the polymer can be controlled. When the catalyst is activated at temperatures in the upper part of the range, particularly from 1300 to 1500° F., the polymers obtained from propylene and heavier olefins have a lower average molecular weight and contain less tacky and solid polymer, while activation temperatures in the lower part of the range produce a catalyst which effects an increase in molecular weight of the polymer and the production of larger proportions of heavy tacky and solid polymer. The catalyst can be prepared using, as starting material, chromium trioxide, chromic nitrate, chromic acetate, chromic chloride, chromic sulfate, ammonium chromate, ammonium dichromate, or other soluble salts of chromium. The highest conversions were obtained from the catalyst that contained only chromium oxides after activation. Impregnation with chromium trioxide ($CrO_3$) is preferred, although chromic nitrate can be used with similar results. It is believed that the catalyst prepared from the chloride and that prepared from the sulfate are at least partially converted to oxide during activation. The amount of chromium, as chromium oxide, in the catalyst can range from 0.1 to 10 or more weight percent and is ordinarily a minor component of the catalyst in terms of weight percent. Chromium contents as high as 50 weight percent are operative, but amounts above 10 weight percent appear to have little added advantage for the polymerization of ethylene. However, for the polymerization of propylene and higher boiling olefins, chromium contents as high as 25 or 30 percent are often advantageous. A preferred non-chromium component or "support" is a silica-alumina composite containing a major proportion of silica and a minor proportion of alumina. While the method of preparing the silica-alumina composite undoubtedly affects the catalyst activity to some extent, it appears that silica-alumina composites prepared by any of the prior art processes for preparing such catalytically active composites are operative for the process of this invention. Coprecipitation and impregnation are examples of such processes. One support that has been found particularly effective is a coprecipitated 90 percent silica-10 percent alumina support. It is found that steam treatment of certain commercially available forms of silica-alumina or silica without appreciable alumina, improves the activity and life of the catalyst composite in a polymerization reaction. A silica support of lower surface area and larger pore size is a better support than one having extremely high surface area and small pore size. These factors are believed to be of importance in the removal of the heavy polymer from the surface of the catalyst composite. A chromium oxide-alumina catalyst ordinarily has about two-thirds the activity of a chromium oxide-silica-alumina catalyst. It is necessary for some of the chromium to be in the hexavalent state to act as an active promoter or catalyst for the polymerization reaction of this invention. It is preferred to use catalyst in which the amount of hexavalent chromium is at least 0.1 percent of the weight of the catalyst composite, at least at the initial contacting with the hydrocarbon. The hexavalent chromium is determined by ascertaining the water-soluble chromium present by leaching with water and determining the dissolved chromium in the leachings by any suitable analytical method known in the art, e. g. addition of potassium iodide solution and titration of the liberated iodine with sodium thiosulfate solution.

The preferred steam activation of certain silica-alumina bases, previously mentioned, is conducted at a temperature of approximately 1200° F. for 10 hours utilizing 5 volume percent steam admixed with 95 volume percent air. In the steam activation treatment, the temperature can be varied from 1100 to 1300° F. and the steam content of the steam-air mixture can range from about 3 to about 10 percent. The time of treatment can vary from about 4 to about 15 hours.

Another suitable "base" or "support" for our catalyst is microspherical silica-alumina containing, for example, 10 to 15 weight percent alumina.

The molecular weight of the product can be changed by pretreating the catalyst base, preferably before addition of the chromium oxide, with a fluoride, alone or in aqueous or non-aqueous solution, e. g., aqueous or anhydrous hydrogen fluoride or other organic or inorganic fluoride, especially a volatile fluoride such as ammonium fluoride or ammonium hydrogen fluoride, and heating, e. g., at from 300 to 1100° F. for from 0.5 to 10 hours, to remove residual fluoride. This treatment results in a catalyst which, after addition of the chromium oxide, produces a polymer of increased molecular weight and flexibility. From 0.001 to 0.2 part by weight of the fluoride per part by weight of oxide treated produces the improved results, although these figures do not represent absolute limits.

The terms "support" or "base," as used herein, are not to be narrowly interpreted. They are not limited to mere inert components of the catalyst mass. In fact, the non-chromium components appear to impart to the catalyst at least part of its activity, and variations in their identity and proportions affect the catalyst activity. The "support" is preferably utilized in the porous form, e. g., a gel. Other methods of preparing the catalyst, e. g., coprecipitation, are within the scope of the invention.

The temperature to be used in carrying out the polymerization reaction can vary over a broad range but normally ranges from about 100 to about 500° F., preferably 150 to 450° F. The preferred range for propylene and higher olefins is 150 to 250° F., and that for ethylene is 275 to 375° F. when a fixed bed of catalyst is utilized. When a mobile catalyst is used, the preferred polymerization temperature range is 175 to 350° F. for ethylene and that for propylene and heavier olefins is about 180 to 200° F. At temperatures lower than those in the preferred ranges, the rate of catalyst deactivation increases and catalyst-bed plugging may occur, and at temperatures higher than those in the preferred ranges, the rate of catalyst deactivation increases and polymer molecular weight decreases. Our polymerization process is a relatively low-temperature process. The maximum temperature of polymerization appears to be that at which reaction, other than polymerization, between the hydrocarbon feed, or some component or components thereof, and the catalyst proceeds at such a rate, relative to that of polymerization, that polymerization is negligible, at least as regards the formation of solid polymer. This temperature is in the vicinity of 500° F. Ordinarily, the process is conducted at temperatures up to only about 450° F., and usually not above 375° F.

The pressure is preferably high enough to maintain any diluent (substantially discussed) in the liquid phase and to assure that olefins not liquefied under these conditions are dissolved in the liquid phase in sufficient amount. This often, but not invariably, requires a pressure of at least 100 to 300 p. s. i., depending on the feed and the temperature, and a pressure of approximately 500 p. s. i. is to be preferred. The perssure can be as high as 700 p. s. i. or higher, if desired. It can be as low as atmospheric when, for example, the reaction is conducted in the gaseous phase. As a general rule, high pressures favor the production of high molecular weight polymers, all other conditions being constant. The feed rate can range from 0.1 to 20 liquid hourly space velocity with a preferred range of 1 to 6 liquid hourly space velocity in a liquid-phase process with fixed-bed catalyst. Hydrocarbon diluents, preferably paraffins and/or cycloparaffins, serve as solvents for the polymer products to aid in the removal of the product from the catalyst in the reactor or as diluents. The diluents include aliphatic paraffins having from 3 to 12, preferably 5 to 12, carbon atoms per molecule. Any hydrocarbon diluent which is relatively inert, non-deleterious, and liquid under the reaction conditions of the process can be utilized. Diluents that have been used successfully for the polymerization of ethylene, propylene and other olefins according to this invention include propane, isobutane, normal butane, normal pentane, isopentane, isooctane (2,2,4-trimethylpentane), cyclohexane, and methylcyclohexane. Normal hexane, the isohexanes such as neohexane and diisopropyl, normal heptane, the isoheptanes such as 2-methylhexane and triptane, normal octane, normal nonane, the isononanes, cyclopentane, methylcyclopentane, the dimethylcyclopentanes, and the dimethylcyclohexanes can also be used. Methane and/or ethane can be used, especially where gas-phase contacting is practiced, and for liquid-phase contacting they can be used in admixture with the heavier hydrocarbons mentioned. The heavier paraffinic diluents have a higher solvent power for the product polymer than do the lighter ones. However, the lighter paraffins are quite useful in our process. Aromatic hydrocarbon diluents are operative, although less preferred in many cases, since it appears that they require more expensive purification than do nonaromatics.

The polymerization can be effected with a fixed-bed catalyst or with a mobile catalyst. A frequently preferred method of conducting the polymerization reaction comprises contacting the feed olefin with a slurry of the comminuted chromium oxide catalyst in suspension in the solvent or diluent. From about 0.01 to 10 weight percent of catalyst, based on weight of diluent, is ordinarily used. The catalyst can be maintained in suspension by a mechanical agitation device and/or by virtue of the velocity of the incoming feed or diluent. In this type of operation, a large portion of the product polymer remains associated with the catalyst, which is withdrawn from the reaction zone, as a slurry. The polymer can be separated from the catalyst by dissolution in a solvent of the type described, usually with the aid of heat and agitation, and the stripped catalyst can be recycled and/or regenerated. The regeneration can be accomplished by oxidizing the residual carbonaceous deposit with a controlled concentration of oxygen in an inert gas by conventional procedures. However the productivity of our catalyst is sufficiently high that it is often economical to discard the used catalyst after a single pass through the reactor. In some cases, especially where a pigment such as carbon black is to be added to the polymer product, or where high polymer productivity is obtained, the catalyst need not even be separated from the polymer.

One problem encountered in fixed-bed operation of the polymerization process of the invention lies in the plugging of the catalyst with heavy polymer. Periodically reversing the direction of flow of feed through the catalyst bed aids in distributing the heavy polymer over the catalyst and extends the time in which the catalyst can be utilized before regeneration is required. Effecting the process by countercurrently contacting a slowly gravitating bed of the catalyst with the liquid feed makes it possible to utilize the catalyst over longer periods of time before regeneration is necessary and entirely prevents plugging of the catalyst bed which eventually occurs in fixed-bed operation. The olefin-containing feed, together with a hydrocarbon solvent, such as n-pentane or isooctane, under sufficient pressure to maintain liquid phase, is charged into the bottom of the reactor and moved upwardly at a linear velocity which can be sufficient to give some expansion of the bed to prevent plugging by high polymer accumulation but insufficient to cause substantial top-to-bottom mixing of the catalyst. In this type of operation, it is possible to maintain a top bed temperature in the range of 100 to 150° F. and a bottom bed temperature in the same range, while the temperature of the middle section of the bed is maintained in the range of about 200 to 250° F. in propylene or higher 1-olefin polymerization. This type of operation and temperature control effects the production of a larger proportion of high molecular weight polymer in both the top and bottom sections of the bed and increases the yield of tacky and solid polymer. Temperature is controlled by regulating the temperature of the feed and the temperature of the incoming catalyst. The feed cools the hotter catalyst coming from the middle or intermediate section of the bed, and the cooler catalyst admitted to the top section of the bed cools the liquid passing into the top section of the bed from the hotter intermediate section. In the moving-bed process, the liquid feed rate is maintained in the range of 2 to 6 v./v./hr., the olefin concentration, in the hydrocarbon feed, in the range of 0.1 to 25 weight percent, and the catalyst rate in the range of 0.1 to 0.5 v./v./hr. In this process, fresh olefin-containing feed contacts the less active catalyst at a minimum temperature so that excessive reaction is avoided and heavier polymer is produced. The upflowing feed is heated by direct heat exchange with hot catalyst from the higher temperature region produced by heat of reaction, and the temperature reaches a maximum at or near the middle of the bed. As the feed moves on up through the top part of the bed, it becomes more depleted in olefins and is cooled by direct heat exchange with cooler fresh catalyst. In the top part of the bed, the fresh, highly active catalyst contacts the olefin-depleted feed at or near the minimum temperature of the range so that excessive reaction is avoided and heavier polymer is produced. The effluent from the top of the reactor contains the total polymer (except polymer deposited on the catalyst), together with the hydrocarbon solvent, such as pentane or isooctane. Polymer remaining on the catalyst can be recovered, at least in part, by treatment of the catalyst with a suitable solvent, such as those previously described herein, at a temperature above reaction temperature, or by stripping the catalyst with an inert gas at a still higher temperature, e. g., 700 to as high as 1100° F. or higher, the effluent stripping gas being cooled to condense polymer removed therein. The polymer can be recovered from solution in the solvent by evaporation of the solvent. Operation with the temperature gradients indicated results in considerable reaction at lower temperatures than would otherwise be possible, and ultimately results in the production of heavier polymer. In addition, excessive reaction in a narrow zone with plugging difficulties and catalyst disintegration are avoided.

Used catalyst can be regenerated in auxiliary equipment in the usual manner. The catalyst is first washed with a hydrocarbon solvent, such as pentane, isooctane, or cyclohexane, at a temperature in the range of 300 to 400° F. under sufficient pressure to maintain the solvent in the liquid phase. Following this, solvent vapor is removed by flushing with inert gas and any remaining solid polymer is removed from the catalyst with dry air diluted with inert gas. The temperature at which the solid polymer is burned off the catalyst is maintained preferably in the range of 900 to 1100° F. Solid polymer is recovered from the solvent used in the washing step and the polymer-free solvent is reusable in subsequent washings.

Figure 1:
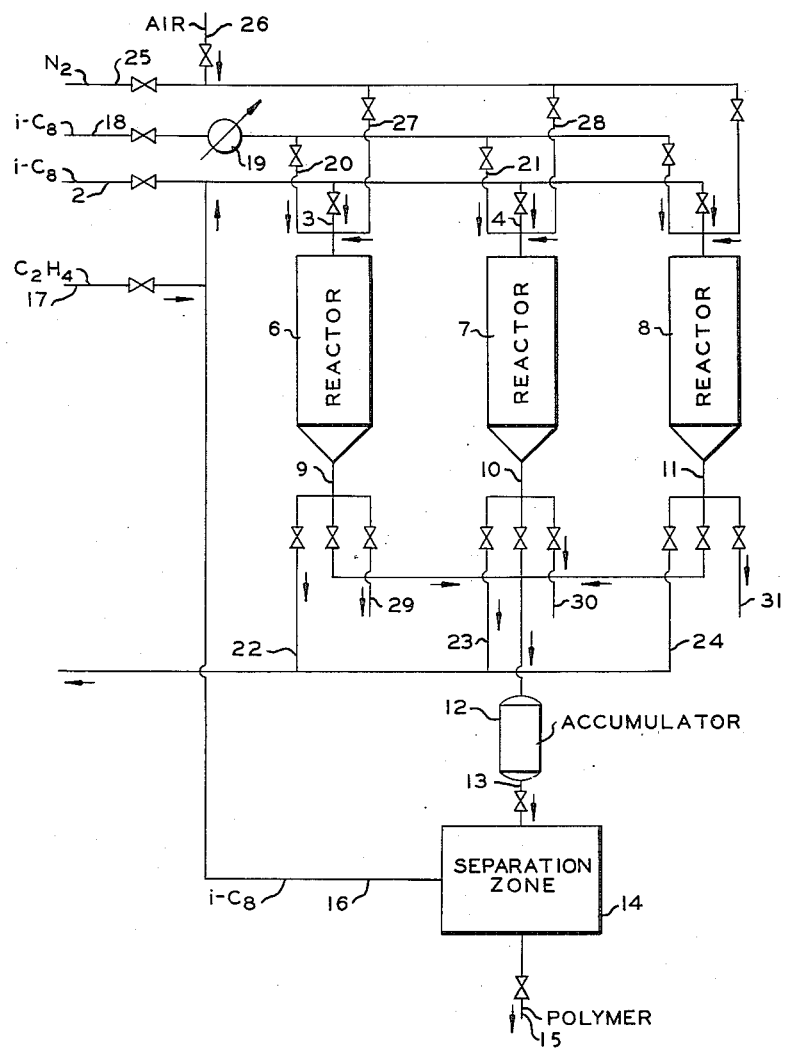
Figure 1 is a diagrammatic flow sheet of a process for conducting the polymerization according to this invention in a fixed-bed reactor.

As shown in Figure 1, isooctane and ethylene are supplied through lines 2 and 17, respectively, to branch line 3 and reactor 6. Reactor 6 contains a fixed bed of composite chromium oxide catalyst of the type previously discussed and is connected in parallel with reactors 7 and 8, which also contain composite chromium oxide polymerization catalyst according to this invention. The mixture of ethylene and isooctane passes through reactor 6 under polymerization conditions previously described, for example, 330° F., 600 p. s. i. and a liquid hourly space velocity of 2. The effluent passes through lines 9 and 10 to accumulator 12. Fluid is withdrawn from accumulator 12 and passed through line 13 to separation zone 14 wherein the effluent is separated into two or more fractions, for example, an isooctane fraction, which is recycled through conduit 16, and a product polymer fraction which is withdrawn through outlet 15.

After some time on stream, the activity of the catalyst in reactor 6 declines as a result of the deposition of heavy polymer thereon. At this time, the isooctane-ethylene feed is passed through branch line 4 into reactor 7, and the reaction is conducted as previously described. Isooctane is supplied through line 18, heated, for example, to a temperature of 350 to 375° F. in heater 19 and is passed through lines 20 and 3 into reactor 6, therein dissolving deposited heavy polymer. The resulting solution can be passed through lines 9 and 10 to accumulator 12, the polymer being recovered along with the polymer obtained in the reaction effluent, as previously described. Alternatively, part or all of the solution can be passed through lines 9, 22 and 24 and fractionated separately, for example, by fractional distillation. This procedure is sometimes advantageous, since the polymer deposited on the catalyst surface has a higher molecular weight than that obtained from the reaction effluent and two different polymers can thus be obtained in the same process. After the removal of deposited polymer from reactor 6 has been completed, the heated isooctane can be passed through lines 21 and 4 to remove polymer deposited in reactor 7. The polymerization reaction is then conducted in reactor 8 by passing the isooctane-ethylene mixture through line 2, the effluent from reactor 8 being passed through conduits 11 and 10 to separation zone 14, as previously described. Nitrogen, supplied through lines 25 and 27 to conduit 3 and reactor 6, is then used to flush hydrocarbon vapor from reactor 6 preparatory to regeneration. Air is then introduced into the system through line 26 and the catalyst is reactivated by combustion, as previously described, the combustion gas being withdrawn through outlet 29. By the use of valved conduits 28 and 25 and outlets 30 and 31, the catalyst masses in reactors 7 and 8 can likewise be regenerated. Thus, one of the reactors is utilized for polymerization, while a second is being operated to remove deposited polymer from the catalyst and the catalyst in a third is being regenerated.

After regeneration, the catalyst is cooled in dry air or dry inert gas. If desired, a fourth reactor (not shown) can be utilized in parallel with reactors 6, 7 and 8, so that regeneration of one mass of catalyst by burning carbonaceous deposits therefrom and activation of another by heating at a high temperature, as previously described, preferably in the presence of dry air, can be conducted simultaneously with polymerization and polymer deposit removal.

Figure 2:
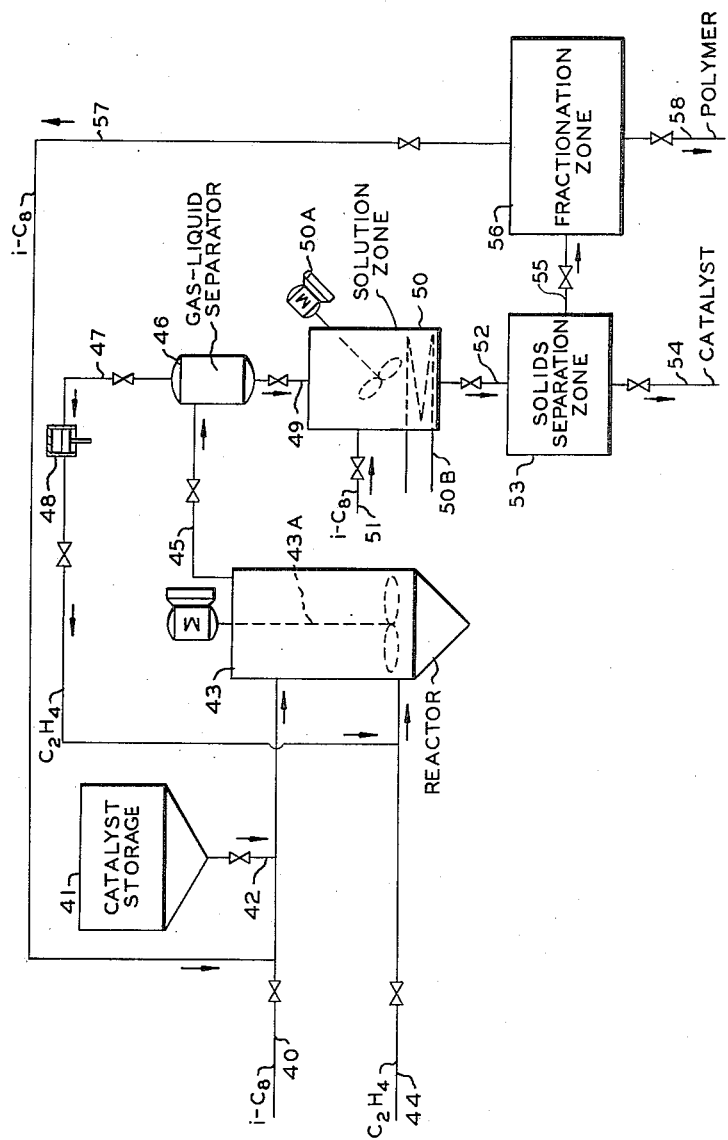
Figure 2 illustrates another embodiment of the invention in which a suspended catalyst is used.

In the system illustrated in Figure 2, isooctane enters through inlet 40 and is mixed with comminuted chromium oxide catalyst supplied from storage vessel 41 through conduit 42. The suspension of catalyst in solvent passes to reactor 43, which is maintained under turbulence effective to maintain the catalyst in suspension in the reaction mixture. In Figure 2, the turbulence producing means is illustrated as motor-driven stirrer 43A. However, other known agitation means, such as a jet agitator, can be used. Ethylene enters the system through inlet 44 and is polymerized in reactor 43 under conditions previously described, e. g., 250° F. and 500 p. s. i. The catalyst supply rate can be varied over a broad range, depending on the characteristics of the particular catalyst used and on the reaction conditions. From 0.01 to 10 parts by weight of catalyst per 100 parts by weight of solvent give satisfactory results in most cases. An effluent in the form of a slurry is removed from the reactor through line 45 and passed to gas-liquid separator 46 wherein unreacted ethylene and/or other gas is separated from the liquid and solid phases and is recycled through conduit 47 and compressor 48. Part or all of this gas can be removed from the system through means not shown. Such withdrawal is often desirable when substantial amounts of inert gas are present in the gas from separator 46. The nongaseous material is passed from gas-liquid separator 46 through conduit 49 to solution zone 50 which is provided with stirrer 50A and heating means, such as a steam coil 50B. In solution zone 50, the mixture is heated to a temperature at least 25° F. above the reaction temperature and is subjected to agitation for a sufficient time to effect solution of the polymer in the solvent, exemplified here as isooctane, which is maintained in the liquid phase by application of pressure. Additional solvent can be added through inlet 51. A highly desirable method of effecting the dissolution of the polymer is described in more detail in the copending application of J. P. Hogan and E. R. Francis, Serial No. 445,042, filed July 22, 1954. The resulting mixture of solution and catalyst is passed through conduit 52 to solids separation zone 53, which can be a centrifuge, a filter or other known equipment for the removal of solids from liquids at elevated temperatures and pressures. The catalyst is removed through outlet 54, and can be recycled, by means not shown, passed to a regeneration system, also not shown, or can be discarded. The regeneration can be effected as previously described. It will be evident to those skilled in the art that known techniques of fluidized catalyst regeneration can be applied to the catalyst regeneration step hereinbefore described. The solid separation in zone 53 is conducted under substantially the same temperature and pressure conditions as obtained in solution zone 50. Solid-free mixture passes through conduit 55 to fractionation zone 56, which can be a fractional distillation apparatus, evaporation equipment, or apparatus for chilling the solution, for example, to about 70° F. or lower, to precipitate the polymer as a solid and recover the precipitated polymer by filtration, for example. Recovered isooctane is recycled through conduit 57, and product polymer is recovered through outlet 58.

Further, according to this invention, special benefits can be obtained by utilizing, as feed to the process, a mixture of at least two different olefins. For example, ethylene and propylene can be copolymerized, as can ethylene and 1-butene, 1-butene and propylene, or propylene and a pentene, in the presence of a chromium oxide polymerization catalyst. By using a propylene-ethylene mixture containing from 10 to 45 weight percent propylene as a feed component, a copolymer is obtained which has increased flexibility and is readily capable of being extruded to form a film. Films of this type are unusually resistant to moisture-vapor penetration and are useful as wrappings for foods, drugs, chemicals, and the like. By using, as a feed ingredient, a propylene-ethylene mixture containing from 0.5 to 10 weight percent propylene, spalling or disintegration of the catalyst particles is decreased. This is an advantage in a fixed-bed or gravitating-bed process where filtration is not needed for catalyst removal. A similar effect is obtained by the use of a propylene-ethylene mixture containing from about 1 to about 20 weight percent ethylene. The preferred temperature range for ethylene-propylene copolymerization is from 175 to 320° F., more preferably 200 to 280° F.

Many of the copolymers of this invention have a flexibility rating, as determined by the falling ball method, of at least 72 inches, even when produced in a fixed-bed process. This rating is determined by allowing a 90-gram steel ball to fall from a measured height and strike a molded disc of the copolymer two inches in diameter and one-eighth inch thick. The ball falls along a mechanical guide, and the height from which the ball drops is measured. The minimum height required to shatter the molded disc is taken as a rating of flexibility or susceptibility to shattering. The maximum height measurable according to this method and apparatus is 72 inches. Thus, many of the copolymers of this invention are not shattered by the falling ball within the limits of measurement of the method. In contrast, so-called brittle polymers can be shattered by the ball when it falls from a much smaller height, such as no more than 6 to 10 inches.

In addition, diolefins can be copolymerized with 1-monoolefins of the class herein defined. Thus ethylene and 1,3-butadiene have been copolymerized, according to this invention, in a 9:1 weight ratio in the presence of a chromium oxide-silica-alumina (2.5% Cr) catalyst at 270° F. to obtain a copolymer having a molecular weight of 33,690.

The polymer and copolymer films prepared according to this invention have a moisture penetration rating not greater than 1 gram per mil thickness per 100 square inches per 24 hours. The method of determination of moisture transmission or penetration is referred to in certain of the subsequent examples. The films are also characterized by having transverse tear strengths of at least 170, and often at least 185, grams per mil of thickness, as determined by a method subsequently described herein.

Films extruded from solid, flexible, high copolymers prepared by the copolymerization of ethylene with propylene over a chromium oxide-silica-alumina catalyst according to this invention have, in addition to very low moisture-vapor permeability, good tensile strength and tear strength. They are superior in moisture-vapor permeability to films prepared from presently available commercial polyethylenes produced by other processes. They are particularly desirable for film packaging materials for meats, cheese, fresh vegetables, dried eggs, milk, etc., and for coating paper to be used as packaging material. Films ranging in thickness from ⅛ inch to 0.001 inch or less can be prepared from the copolymers of this invention.

Films prepared by blending commercial polyethylene with solid ethylene polymers prepared over a chromium oxide-silica-alumina catalyst have low moisture-vapor permeability. Films prepared from ethylene-propylene copolymers, as herein described, have properties as good or better than those prepared from blends of the two types of ethylene polymers and, in addition, there are certain advantages in the process steps for the production of the copolymer films. Ethylene-propylene copolymers are readily prepared and used as such for extrusion into films without further processing.

Many of the ethylene-propylene copolymers of this invention are flexible materials which generally have a melt index less than 25, preferably between 0.01 and 1.0. (Melt index, as determined by ASTM method D 1238-52 T, is the rate of extrusion of a thermoplastic material through an orifice of a specified length and diameter, under prescribed conditions of temperature and pressure.)

The following specific examples present data which illustrate and clarify the invention but should not be so interpreted as to restrict or limit the invention unnecessarily.

SPECIFIC EXAMPLES

Example I.—Polymerization of olefins over chromium oxide-silica-alumina

Individual monoolefins and diolefins were polymerized in flow-type runs over a fixed bed of 3 percent chromium as oxide in a chromium oxide-silica-alumina [1] catalyst (prepared by impregnation witht $CrO_3$ solution, activation above 700° F. in dry air) at about 600 pounds per square inch at a temperature of about 190° F. and a liquid hourly space velocity of 2, the feed containing 20 mol percent reactant and 80 mol percent isobutane. Most runs were for 4 to 6 hours. The results of the conversions and the qualitative nature of the polymers are given in Table I.

TABLE I

| Monomer | Average Conversion, Percent | Type of Polymer, etc. |
| --- | --- | --- |
| Normal 1-olefins: | | |
| Ethylene | 100 | Solid, slightly waxy. Reactor plugged in 2 hrs. |
| Propylene | 91 | Tacky, semi-solid. |
| 1-Butene | 77 | Tacky, elastic semi-solid. |
| 1-Pentene | 82 | Tackier than polypropylene; semi-solid. |
| 1-Hexene | 40–56 | Very tacky, transparent semi-solid. |
| 1-Octene | 58 | Tacky, contained about 4 wt.% solids including wax (possibly dimer or trimer). |
| 1-Dodecene | 16 | (Run at 260° F.) liquid. |
| Normal 2-olefins: | | |
| 2-Butene | 5 | Liquid (dimer and trimer). |
| 2-Pentene | 5 | Liquid (dimer and trimer). |
| 2-Hexene | 11 | Liquid (dimer and trimer). |
| 2-Octene | 1 | Wax (probably dimer and trimer). |
| Branched 1-olefins: | | |
| Isobutylene | 87 | Liquid (dimer and trimer). |
| 2-Methyl-1-butene | 6 | Liquid (dimer and trimer). |
| 3-Methyl-1-butene | 15 | Liquid (dimer and trimer). |
| 4-Methyl-1-pentene | 80 | Semisolid. |
| 4-Vinylcyclohexene | 6 | Liquid. |
| Branched 2-olefins: | | |
| 2-methyl-2-butene | 12 | Liquid. |
| Cyclic Olefins: | | |
| Cyclohexene | <5 | Liquid. |
| Diolefins: | | |
| Butadiene | 55 | Solid. |
| Isoprene | 34 | Solid. |
| Aryl Olefins: | | |
| Styrene | 0 | |

The results show that only 1-olefins give the high polymer. Normal 1-olefins give high polymers which vary in degree of solidity and tackiness as noted. Ethylene reacted most vigorously, and it appeared that the reaction rate decreased as the length of the polymer chain increased.

For the branched 1-olefins tested, any branching closer to the double bond than the 4-position prevented formation of heavy polymer. 4-methyl-1-pentene gave semi-solid polymer which was successfully expelled from the reactor in continuous-flow operation.

Both 1,3-butadiene and isoprene gave solid polymer.

Example II.—Effect of temperature on propylene conversion

Runs were made with chromium oxide-silica-alumina (weight ratio $SiO_2:Al_2O_3=9:1$) catalyst containing 3 percent chromium as chromium oxide (prepared as in Example I), operating at 600 pounds per square inch, a liquid hourly space velocity of 2, and a feed consisting of 11 mol percent propylene, 14 mol percent propane, and 74 mol percent isopentane. The data obtained are given in Table II and indicate an optimum temperature range of 150 to 250° F.

TABLE II

| Temp., ° F. | Propylene Conversion, Percent | | |
| --- | --- | --- | --- |
| | After 2 hrs. | 3 hrs. | 4 hrs. |
| 150 | 59 | 82 | 89 |
| 190 | 93 | 95 | 94 |
| 250 | 86 | 90 | 83 |
| 300 | 62 | 33 | 23 |

Example III

Hydrocarbon diluent was varied in runs made at 180 to 190° F., 600 pounds per square inch, two liquid hourly space velocity of feed containing propylene, propane and other diluent. The results are given in Table III. An improvement in conversion was obtained as the molecular weight of the feed diluent was increased from propane to isobutane to pentane or isopentane. No further improvement was obtained in short runs with isooctane as diluent. However, in longer runs, isooctane showed improvement over the other diluents, as shown in Table IV.

TABLE III

| Solvent Tested | Feed Composition, Mol Percent | | | Percent $C_3H_6$ Conv., Hrs. | | | |
| --- | --- | --- | --- | --- | --- | --- | --- |
| | Solvent | $C_3H_6$ | $C_3H_8$ | 2 | 3 | 4 | 5 |
| Propane | | 25 | 75 | 82 | 82 | | 86 |
| Isobutane | 88 | 12 | | 90 | | 92 | 87 |
| n-Pentane | 75 | 12 | 13 | | 91 | 95 | 96 |
| Isopentane | 75 | 12 | 13 | 93 | 95 | 97 | 97 |
| Isooctane | 66 | 17 | 17 | 84 | 92 | 96 | 98 |

TABLE IV

[Operation at 220° F., 600 p. s. i. g., 2 L. H. S. V. of feed, containing 9 mol percent $C_3H_6$, 12 mol percent $C_3H_8$, 79 mol percent solvent.]

| Solvent | Percent $C_3H_6$ Conversion, Hrs. | | | |
| --- | --- | --- | --- | --- |
| | 5 | 10 | 20 | 40 |
| Isopentane | 95 | 92 | 72 | 44 |
| Isooctane | 97 | 94 | 82 | 58 |

The catalyst had the same composition as that in Example II and was prepared in the same manner, i. e., impregnation and activation as previously described.

Example IV.—Suspended catalyst

Shaker-autoclave tests were made to study batch operation and to determine the effects of varying the feed-to-catalyst ratio in this type of operation. The catalyst was 14/28 mesh silica-alumina [1] promoted with 3 percent by weight of chromium as chromium oxide and activated at 930° F. (preparation as previously described). The feed stock was a blend of 20 mol percent technical grade propylene and 80 mol percent technical grade isobutane. The catalyst was suspended in the liquid charge in the shaker-autoclave for six hours at a temperature of 190° F. The results of these tests are shown in Table V. For a constant reaction time of 6 hours, the total propylene conversion decreased from 98 percent with a 4:1 feed-to-catalyst weight ratio to 18 percent with a 50:1 ratio. However, calculations showed (see Table V) that the grams of propylene converted per gram of catalyst increased from 0.54 with a 4:1 feed-to-catalyst ratio to 1.41 with a 10:1 ratio, and thereafter remained relatively constant.

[1] $SiO_2:Al_2O_3$, 9:1 by weight.

TABLE V

*Propylene conversion per gram of catalyst in autoclave tests*

[Six-hour tests at 190° F. with 20 mol percent $C_3H_6$, 80 mol percent $iC_4H_{10}$ feed.]

| Feed-to-Catalyst Weight Ratio | Percent $C_3H_6$ Converted | Grams $C_3H_6$ Converted Per Gram of Catalyst |
|---|---|---|
| 4:1 | 98 | 0.54 |
| 8:1 | 95 | 1.15 |
| 10:1 | 91 | 1.41 |
| 25:1 | 38 | 1.35 |
| 50:1 | 18 | 1.33 |

*Example V.—Chromium oxide content of the catalyst*

To determine the effect of chromium oxide content of the catalyst upon activity of the catalyst and nature of the product, catalysts were prepared by impregnating a commercial steam-aged silica-alumina support with aqueous chromium nitrate or trioxide solutions over a wide range of concentrations. The results of propylene polymerization tests with these catalysts are shown in Table VI. The support contained 90 weight percent silica and 10 weight percent alumina. The catalyst was activated by heating for several hours at 900 to 1000° F. in anhydrous air.

TABLE VI

*Variation of chromium oxide content of catalyst*

Commercial steam-aged silica-alumina, 14/28 mesh, promoted with various amounts of chromium oxide. Runs made at 180 to 190° F., 600 p. s. i. g., and 2 L. H. S. V. of 12 mol percent propylene, 13 mol percent propane, 75 mol percent isopentane feed.

| Chromium Content of Catalyst, Wt. Percent | Percent $C_3H_6$ Conv., Hrs. | | | | Nature of Polymer |
|---|---|---|---|---|---|
| | 2 | 3 | 4 | 5 | |
| 0.16 | 73 | 83 | 94 | 88 | Sirupy semi-solid. |
| 1 | 66 | 87 | 94 | 97 | Semi-solid, tacky. |
| 1.5 | 83 | 95 | 98 | 97 | Semi-solid, tacky. |
| 3 | 93 | 95 | 97 | 97 | Semi-solid, tacky. |
| 6 | | 80 | | 89 | Semi-solid, tacky. |

From the results shown in Table VI, it appears that the preferable chromium oxide content of the silica-alumina support was in the range of one to three weight percent, expressed as chromium, under the conditions investigated. The catalysts of higher chromium oxide content produced what appeared to be slightly more viscous polymer, but the effect was small considering the range covered.

TABLE VII

Five-hour runs with ethylene were made at 308 to 313° F., 400 p. s. i. g., 4.6 to 5.2 L. H. S. V. of about 3 weight percent ethylene, 97 weight percent isooctane (2,2,4-trimethylpentane). Catalyst preparation as in foregoing examples.

| Chromium Content of Catalyst, Wt. Percent | Conversion, Wt. Percent |
|---|---|
| 0.17 | 83 |
| 0.66 | 95 |
| 2.25 | 100 |
| 7.66 | 93 |

*Example VI*

Table VIII presents the results obtained with supports of varying silica-alumina ratio and source, and from supports other than silica-alumina.

Each catalyst was prepared by impregnating the 14/28 mesh support with an 0.8 molar aqueous solution of chromium nitrate, drying, and activating for five hours at 930° F. in dry air. The finished catalyst contained about 2 to 4 weight percent chromium as oxide. The catalysts were then tested in polymerization runs with propylene-propane-isopentane feed as described in Table VIII.

TABLE VIII

*Survey of catalyst supports*

Chromium oxide-promoted catalysts were prepared from the supports shown. Polymerization tests at 180° F., 600 p. s. i. g., and 2 L. H. S. V. of 12 mol percent propylene, 13 mol percent propane, 75 mol percent isopentane feed.

| Catalyst Support | Percent $C_3H_6$ Conv.[1] | | | |
|---|---|---|---|---|
| | 2 hr. | 3 hr. | 4 hr. | 5 hr. |
| Silica gel | 77 | 85 | 85 | 70 |
| 98% silica, 2% alumina | 69 | 76 | 33 | 35 |
| 90% silica, 10% alumina (extruded pellets) | 93 | 95 | 97 | 97 |
| 90% silica, 10% alumina (beads) | 73 | 90 | 93 | 94 |
| 54% silica, 46% alumina (Filtrol) | 79 | 77 | 67 | 55 |
| 5% silica, 95% alumina | 62 | 72 | 69 | 66 |
| Alumina gel | 45 | 45 | 36 | 30 |
| HF-treated alumina gel | 53 | 39 | 35 | 28 |
| Bauxite | 62 | 57 | 60 | |
| Brucite (magnesium oxide) | 0 | | | |
| Activated carbon | 0 | | | |
| 86% $SiO_2$—10% $ZrO_2$—4% $Al_2O_3$ | | 89 | 95 | 94 |
| Chrome-bead $SiO_2$-$Al_2O_3$ (0.4 wt. % Cr) | 90 | 86 | 70 | 56 |

[1] High molecular weight tacky and solid polymer was produced in all runs in which propylene was converted.

It is seen from Table VIII that, although conversion of propylene was obtained over the entire range of silica-alumina ratio, the catalysts of highest activity were prepared from coprecipitated 90 silica-10 alumina supports. The 54 silica-46 alumina support was an acid-activated halloysite clay.

The commercial pellets and commercial bead supports were of the same apparent chemical composition (90 percent silica, 10 percent alumina), but the pelleted support, which was prepared by coprecipitation and steam aging, appeared to provide a more satisfactory catalyst. On account of the differences in methods of preparation of these two supports, the commercial pellets have lower surface area and larger pore size than the beads and have a greater number of so-called "macropores" per unit weight or volume. These factors are believed to be of importance in the removal of the heavy polymer from the chromium oxide-silica-alumina catalyst surface.

The "HF-treated alumina" in Table VIII was prepared by precipitating alumina gel from 3640 grams of aluminum nitrate nonahydrate in solution in 28 liters of water by addition of 2 liters of 28 percent aqueous ammonia, mixing the filtered, undried gel with 9.5 ml. of 47 percent aqueous hydrofluoric acid in 200 ml. of water, stirring for 2 hours, drying the mixture at 215° F. for 24 hours, calcining at 750 to 800° F. for 20 hours, forming the solid into pellets by use of a hydrogenated vegetable oil as a binder, and burning out the binder at about 1000° F.

The two supports containing neither silica nor alumina gave no conversion of propylene. A catalyst prepared with commercial silica-zirconia-alumina cracking catalyst as support gave good conversion. The commercial chrome-bead silica-alumina cracking catalyst, already containing 0.5 percent chromium oxide, produced high molecular weight polymer from propylene with no further addition of chromium oxide but the activity declined relatively rapidly.

Example VII.—Metal oxide components

A survey of the available metal oxides as possible catalyst components was made and the results of the survey are presented in Table IX. In each case, commercial coprecipitated steam-aged 90 silica-10 alumina was impregnated with an aqueous solution of the compound shown in the table, and the catalyst was dried and then activated at 930° F. in dry air. In most cases, the activated catalyst contained about three to four weight percent of the metal as oxide. The activated catalyst was tested for propylene polymerization under the conditions given in Table IX.

TABLE IX

Survey of metal oxide promoters

Commercial 90 silica-10 alumina, 14/28 mesh, promoted with the compounds listed. Polymerization tests at 160° F., 600 p. s. i. g., and 2 L. H. S. V. of 25 percent propylene, 75 percent propane feed, 5-hour runs.

| Impregnating solution | Probable Component | Percent $C_3H_6$ Conv. | | Polymer | |
|---|---|---|---|---|---|
| | | 2 Hrs. | 5 Hrs. | State | Sp. Gr. |
| $Cr(NO_3)_3 \cdot 9H_2O$ | $Cr_2O_3$-$CrO_3$ | 82 | 86 | Semisolid | |
| Ni&Th nitrates | NiO&$ThO_2$ | 80 | 79 | liquid | 0.71 |
| $Fe(NO_3)_3 \cdot 9H_2O$ | $Fe_2O_3$ | 53 | 60 | liquid | 0.77 |
| $Mn(NO_3)_2 \cdot 6H_2O$ | $MnO_2$ | 54 | 1 32(6) | liquid | 0.76 |
| $UO_2(NO_3)_2 \cdot 6H_2O$ | $UO_3$ | 52 | 25 | liquid | 0.76 |
| $VOC_2O_4$ | $V_2O_5$ | 39 | 38(3) | liquid | 0.77 |
| $(NH_4)_6Mo_7O_{24} \cdot 4H_2O$ | $MoO_3$ | 48 | 55(3) | liquid | 0.74 |
| Reduction of $MoO_3$ | $MoO_2$ | 57 | 44 | liquid | 0.75 |
| $H_2WO_4 + NH_4OH$ | $WO_3$ | 56 | 63 | liquid | 0.75 |
| $Cd(NO_3)_2 \cdot 4H_2O$ | CdO | 10 | | liquid | |
| $Zn(NO_3)_2 \cdot 6H_2O$ | ZnO | 0 | | | |
| $Cu(NO_3)_2 \cdot 3H_2O$ | CuO | 0 | | | |
| $AgNO_3$ | Ag | 0 | | | |
| $ZrO(NO_3)_2 \cdot 2H_2O$ | $ZrO_2$ | 23 | | liquid | 0.76 |
| $SnCl_4$ | $SnCl_2$ | | 43 | liquid | 0.76 |
| $Pb(NO_3)_2$ | PbO | 0 | | | |
| $Pd(NO_3)_2$ | PdO | 34 | 21(4) | liquid | 0.76 |
| $Ce(NO_3)_3 \cdot 6H_2O$ | $CeO_2$ | 10 | | liquid | |
| $H_2PtCl_6 \cdot 6H_2O$ | Pt | 13 | | liquid | |
| $Th(NO_3)_4 \cdot 4H_2O$ | $ThO_2$ | 8 | 7 | liquid | |
| $NaNO_3$ | $Na_2O$ | 0 | | | |
| $Ba(NO_3)_2$ | $BaO_2$-BaO | 8 | | liquid | |
| $Mg(NO_3)_2 \cdot 6H_2O$ | MgO | 8 | | | |
| No Promoter | | 33 | 27 | liquid | 0.75 |

1 Times other than 5 hr. are shown in parentheses.

It is seen from Table IX that only chromium oxide promoted the formation of high molecular weight polymer. A number of other metal compounds acted as promoters for the formation of liquid polymer, as can be seen by comparing the conversion obtained in each run with that obtained with the unpromoted silica-alumina base, shown at the bottom of the table.

Example VIII.—Survey of chromium compounds as catalyst components

Catalysts were prepared from various soluble chromium compounds by impregnation of commercial steam-aged 90 silica-10 alumina with an aqueous solution of the compound, followed by drying and activating at 930° F. in dry air. Each catalyst was then tested in a propylene polymerization run as described in Table X.

TABLE X

Commercial steam-aged 90 silica-10 alumina, 14/28 mesh, impregnated with 3 to 4 weight percent chromium as compounds listed. Polymerization tests at 160° F., 600 p. s. i. g., and 2 L. H. S. V. of 25 mol percent propylene, 75 mol percent propane feed.

| Impregnating Solution | Probable Component | Percent $C_3H_6$ Conv. | | Polymers Description |
|---|---|---|---|---|
| | | 2 Hrs. | 5 Hrs. | |
| $Cr(NO_3)_3 \cdot 9H_2O$ | $Cr_2O_3$-$CrO_3$ | 82 | 86 | Semisolid, tacky. |
| $CrO_3$ | $Cr_2O_3$-$CrO_3$ | 75 | 84 | Semisolid, tacky. |
| $CrCl_3 \cdot 6H_2O$ | $CrCl_2$-$(Cr_2O_3$-$CrO_3)$ | 66 | 49 | Semisolid, tacky. |
| $Cr_2(SO_4)_3 \cdot 5H_2O$ | $Cr_2(SO_4)_3$-$Cr_2O_3$-$CrO_3$ | 86 | 50 | Sirupy, tacky. |
| $H_2$ Reduction of $CrO_3$ Cat. | | 25 | 17 (4 hrs.) | Liquid. |

As shown in Table X, all of the catalysts prepared from the various chromium compounds produced high molecular weight polymer, but the highest conversions were obtained from the catalysts that contained only chromium oxides after activation, i. e., those prepared from chromium nitrate and chroium trioxide. Whether the catalysts prepared from the chloride and sulfate produced high polymer only as a result of partial conversion of chloride or sulfate to oxides during activation is not known but seems likely.

Treatment of chromium oxide catalyst with hydrogen for four hours at 920° F. to reduce hexavalent chromium to the trivalent state gave a catalyst which was almost completely inactive for formation of high polymer. This indicates that hexavalent chromium is essential. Analyses have indicated that a major portion of the chromium oxide present on the catalysts activated at 930° F. in air was hexavalent. (Note Tables XI and XII.)

Example IX.—Variation of catalyst activation temperature

The effects of catalyst activation temperature on catalyst activity and character of polymer were determined over a temperature range of 750 to 1500° F. The catalysts were tested in six-hour propylene polymerization runs at the conditions described in Table XI.

TABLE XI

Catalyst, 14 to 28 mesh commercial steam-aged 90 silica-10 alumina impregnated with chromium oxide, tested in six-hour polymerization runs at 190° F., 600 p. s. i., and 2 L. H. S. V. of 12 mol percent propylene, 13 percent propane and 75 percent isopentane feed.

| Catalyst Activation | | Catalyst Analysis | | | Polymerization Test, Average $C_3H_6$ Conversion | Polymer Analysis [1] MIBK Insoluble at 200° F., Wt. |
|---|---|---|---|---|---|---|
| Temp. °F. | Time Hrs. | Total Cr, Wt. | $Cr^{+6}$ Wt. | $Cr^{+6}$: Total Cr | | |
| | | Percent | Percent | | Percent | Percent |
| 750 | 10 | 2.1 | 2.2 | 1.0 | 90 | |
| 930 | 6 | 2.8 | 2.5 | 0.9 | 97 | |
| 1020 | 5 | 3.1 | 2.4 | 0.8 | 97 | 4.6 |
| 1100 | 5 | 2.1 | 1.9 | 0.9 | 98 | 4.4 |
| 1300 | 5 | 2.2 | 1.6 | 0.7 | 98 | 2.4 |
| 1500 | 5 | 1.6 | 0.8 | 0.5 | 99 | 0.5 |

[1] Does not include heavy material which remained on the unflushed catalyst.

The data in columns 3, 4, and 5 present the weight percent of chromium on the catalyst, the amount of hexavalent chromium, and the fraction of the chromium that is hexavalent. The amount of hexavalent chromium was determined on the basis of water-soluble chromium.

The heavy ends were determined by filtering and weighing the portion of polymers which were insoluble in methylisobutylketone (MIBK) at 200° F. and a solvent to polymer ratio of 40 ml. to one gram. The analyses reported in Tables XI and XII were on polymer samples collected in the solvent-removal flash chamber during the run.

As shown in Table XI, the activity of the catalyst increased as the catalyst activation temperature was increased over the range of 750 to 1500° F. The amount of heavy ends in the polymer, as indicated by the amount of MIBK insoluble at 200° F., was affected by the activation temperature, and apparently the molecular weight of the polymer decreased at the higher activation temperatures.

The ratio of hexavalent chromium to total chromium on the catalyst decreased as the activation temperature was increased.

Several catalysts were prepared by impregnation of commercial microspheroidal (99 wt. percent finer than 100 mesh) silica-alumina (about 13.3 wt. percent alumina, remainder essentially silica) with an aqueous solution of chromium trioxide. The catalysts were fluidized in dry air during activation. Polymerization tests were carried out in a batch-type stirred reactor at 450 p. s. i. g. and 270° F. using cyclohexane as solvent. Approximately 300 grams of solvent and from 0.45 to 1.0 gram of catalyst were charged to the reactor. After heating the reactor contents to reaction temperature, the reactor was pressured with ethylene to within 50 p. s. i., of operating pressure within the first five minutes, and, after the operating pressure of 450 p. s. i. g. was attained, ethylene was fed at the rate required to maintain that pressure. The duration of each run was three hours. The results, which are presented in Table XI-A, show that, as a practical matter, the minimum activation temperature for the catalyst tested lies between 400 and 450° F. when the polymerization is carried out under the conditions of these runs. If the data for the activations at 450, 555, 650, 700, and 750° F. are plotted on rectangular nonlogarithmic coordinates and if more weight is arbitrarily assigned to the point at 650° F. than to that at 555° F., the minimum activation temperature appears to lie between 430° and 440° F. The minimum activation temperature would be lower if relatively long activation times were used. From a practical point of view, the minimum activation temperature can be considered to be about 450° F. This minimum activation temperature applies only to catalysts prepared by a wet method such as impregnation. This point is subsequently discussed in more detail.

TABLE XI-A

*Activation temperature for catalyst prepared by impregnation*

| Catalyst Activation | | | | Catalyst Testing | |
|---|---|---|---|---|---|
| Temperature, °F. | Time, Hours | Percent Total Cr | Percent $Cr^{+6}$ | Productivity #/# | Reaction Rate, #/#/Hr. |
| 950 | 5 | 2.38 | 1.68 | 535 | 178 |
| 825 | 5 | 2.30 | 1.46 | 607 | 202 |
| 750 | 5 | 2.22 | 1.18 | 277 | 92 |
| 700 | 5 | 2.36 | 1.24 | 185 | 62 |
| 650 | 5 | 2.14 | 0.97 | 113 | 35 |
| 555 | 20 | 2.99 | 1.73 | 99 | 33 |
| 450 | 20 | 3.13 | 1.96 | 6.6 | 2.2 |
| 400 | 20 | 3.13 | 2.30 | 0 | 0 |

Several runs were carried out to determine the activation conditions for catalysts prepared by dry mixing of chromium trioxide with the previously mentioned microspheroidal silica-alumina. The silica-alumina was calcined in air for five hours at 1175° F. The calcination was carried out with the material in the fluidized state. After cooling to room temperature, 195 grams of the silica-alumina was mixed with 10 grams of dry chromium trioxide in a dry nitrogen atmosphere by shaking in a flask. Portions of this mixture were further treated as described in Table XI-B, and the resulting catalysts were tested for polymerization activity in a batch-type, stirred reactor at 450 p. s. i. g. and 270° F. About 300 grams of cyclohexane and 10 grams of catalyst were charged to the reactor, and, after heating the reactor contents to reaction temperature, the reactor was pressured to reaction pressure with ethylene within five minutes. The run duration was two hours. The results which are presented in Table XI-B, indicate that optimum activity is obtained by heating. The loss-on-ignition data indicate that moisture was not excessive in any catalyst tested and, consequently, that it was not limiting.

TABLE XI-B

*Activation temperature for catalyst preparation by dry mixing*

| Catalyst Preparation | | | | Catalyst Testing, Yield, #/# Catalyst |
|---|---|---|---|---|
| Method of Mixing $CrO_3$ with Silica-Alumina | Percent Total Cr | Percent $Cr^{+6}$ | Percent Loss on Ignition [1] | |
| Fluidization [2] at 80° F. for two hours | 2.5-3.0 | | 2.73 | <0.1 |
| Fluidization at 400° F. for two hours | 2.5-3.0 | | 1.56 | 3.6 |
| Ball-milled in Dry $N_2$ at 80° F. for 15 hours | 2.5-3.0 | 2.64 | 2.83 | 0.4 |
| Ball-milled 15 hours, followed by fluidization at 400° F. for two hours | 2.5-3.0 | | 2.74 | 13.8 |
| Ball-milled 15 hours,[3] followed by fluidization at 950° F. for five hours | 2.96 | 1.49 | 1.91 | 376 |
| Calcined Silica-Alumina with no $CrO_3$ | | | 1.28 | <0.1 |
| Ball-milled 15 hours, followed by fluidization at 350° F. for two hours | 2.96 | | | 4.2 |

[1] Heated at 1,760° F. in air for 16 hours. Figures not corrected for $Cr^{+6}$ loss.
[2] All fluidization was done with dry air.
[3] 0.5 Gram catalyst used in the polymerization test.

Upon examination of the data of Tables XI-A and XI-B, it will be noted that the impregnated catalyst activation series appears to show that the catalyst should be treated at a temperature of at least around 450° F. to have commercially desirable activity, while in the mixing series a catalyst having appreciable activity was prepared by heating at 350° F. The reason for this difference is believed to reside in the difference in the catalyst preparation methods. When a wet method of preparation, such as impregnation by aqueous solution, is used, the water content of the catalyst must be reduced to a certain level for the catalyst to possess its greatest activity. Apparently this level of moisture content is not reached in a reasonable time at temperatures much below 450° F. On the other hand, when a dry method of preparation is used, for example, mixing of solid $CrO_3$ with calcined silica-alumina, the moisture content need not be limiting, and the minimum temperature appears to be that at which the $CrO_3$ has sufficient mobility to become distributed on the surface of the silica-alumina. For microspheroidal silica-alumina, this minimum temperature appears to be a little below 350° F., although 350° F. could be considered as a minimum from a practical point of view.

*Example X.—Effect of aging of catalyst with dry air and with wet air*

To study the effects of prolonged treatment of the catalyst with dry air and with wet air at elevated temperatures, such as would be encountered in repeated regenerations, the catalysts were aged 88 hours at 1100° F. and 1300° F. with dry air and at 1100° F. with air saturated with water vapor at 100° F. At the end of the aging period with the wet air, which contained about 6.5 percent water vapor, the catalyst was swept with dry air for five hours at 1100° F. Results of the polymerization test on these catalysts and similar data on unaged catalysts are shown in Table XII.

TABLE XII

Catalyst, 14/28 mesh commercial steam-aged 90 silica-10 alumina impregnated with chromium oxide, tested in six-hour polymerization runs at 190° F., 600 p. s. i. g., and 2 L. H. S. V. of 12 mol percent propylene, 13 percent propane and 75 percent isopentane feed.

as otherwise described. The data presented in the succeeding examples were obtained by contacting the feed with 5/32 x 5/32 inch pellets of coprecipitated 90 silica-10 alumina impregnated with chromium oxide (aqueous $CrO_3$), except where specifically indicated otherwise.

*Example XI.—Catalyst supports: Variation of silica-alumina ratio*

Catalyst supports of 90–10, 50–50, and 10–90 silica-alumina compositions were prepared by pilling a mixture of silicic acid and precipitated alumina and calcining at 1000° F. The catalyst bases were impregnated with 0.8-molar chromium trioxide solution and activated at 1300° F. in dry air. Results and operating conditions of the polymerization tests on these catalysts along with data on catalysts prepared using commercial steam-aged 90 silica-10 alumina base are shown in Table XIII.

TABLE XIII

Chromium oxide-promoted catalyst, 5/32-inch pellets, were prepared from the support shown. Polymerization tests at 220° F., 600 p. s. i. g. and 2 L. H. S. V. of 7 mol percent propylene, 9 percent propane and 84 percent isopentane feed.

| Catalyst Support | | Polymerization Test, Percent Propylene Conv., Hrs. | | | | Physical Condition of Used Catalyst |
|---|---|---|---|---|---|---|
| Percent Silica | Percent Alumina | 2 | 5 | 10 | 15 | |
| 10 | 90 | 62 | 39 | 29 | 26 | Good. |
| 50 | 50 | 80 | 72 | 42 | 23 | Good. |
| 90 | 10 | 88 | 91 | 65 | 17 | Spalled. |
| 90 | [1] 10 | 94 | 95 | 92 | 84 | Good. |

[1] Commercial, steam-aged.

| Catalyst Treatment | | | Catalyst Analysis | | | Polymerization Test, Average $C_3H_6$ Conv. | Polymer Analysis,[1] MIBK Insoluble at 200° F. Wt. |
|---|---|---|---|---|---|---|---|
| Temp. °F. | Gas | Time, Hrs. | Total Cr, Wt. | $Cr^{+6}$ Wt. | $Cr^{+6}$: Total Cr | | |
| | | | *Percent* | *Percent* | | *Percent* | *Percent* |
| 1100 | Dry Air | 5 | 2.1 | 1.9 | 0.9 | 98 | 4.4 |
| 1100 | Dry Air | 88 | 2.1 | 1.9 | 0.9 | 99 | 2.2 |
| 1100 | Wet Air [2] | 88 | 2.5 | <0.1 | <0.1 | 55 | 5.1 |
| 1300 | Dry Air | 5 | 2.2 | 1.6 | 0.7 | 98 | 2.4 |
| 1300 | Dry Air | 88 | 2.0 | 1.1 | 0.5 | 98 | 2.5 |

[1] Does not include heavy material which remained on the unflushed catalyst.
[2] Wet air contained about 6.5 percent water vapor. Catalyst was flushed with dry air for five hours at 1,100° F. after the wet air treatment.

As shown in Table XII, treatment with dry air for 88 hours at 1100° F. resulted in a catalyst which had slightly higher activity and produced a lighter weight polymer than did the catalyst activated at 1100° F. for 5 hours. Similar variation in the time of treatment at 1300° F. did not affect the catalyst activity or polymer distribution. The ratio of hexavalent to total chromium on the catalyst was not affected at 1100° F., but decreased slightly at 1300° F. by the prolonged treatment.

Treatment with air containing about 6.5 weight percent water vapor for 88 hours at 1100° F. decreased the activity of the catalyst considerably and, as compared with the run at 1100° F. for 88 hours, doubled the fraction of polymer insoluble in MIBK at 200° F. This catalyst, which contained less than 0.1 percent hexavalent chromium, was a bright-green color as compared to a gray-green for that treated with dry air at 1100° F.

All of the data presented in the previous examples were obtained using 14 to 28 mesh catalyst particles, except As shown in Table XIII, increasing the silica content of the base from 10 to 90 percent increased the initial catalyst activity. After the 15-hour tests, the catalyst prepared from 90 silica-10 alumina support showed signs of spalling, i. e., crumbling or shelling off of the outer layer of the pellets, whereas the catalyst of higher alumina content remained in good physical condition. The steam-aged 90 silica-10 alumina support resisted physical disintegration in contrast to the untreated support having the same composition.

*Example XII.—Effects of variation of operating temperature*

Further studies were made on the effects of operating temperature, and longer tests and more accurate evaluations of the polymer were obtained. Results and operating conditions of these tests are shown in Table XIV. The polymer analyses were on samples which included the polymer flushed from the reactor at the end of the runs. Comparisons of polymers were based on the quantity of light and heavy ends. The light ends were determined by vacuum distillation and are reported as weight percent polymer boiling below 850° F. at one atmosphere pressure. The heavy ends were determined by filtering and weighing the portion of polymers which were insoluble in methylisobutylketone (MIBK) at 200° F. and a solvent to polymer ratio of 40 ml. of one gram.

TABLE XIV

Operation at 600 p. s. i. g. and 2 L. H. S. V. of 7 mol percent propylene, 9 percent propane and 84 percent isopentane feed over chromium oxide-90 silica-10 alumina pelleted catalyst activated at 1300° F. in dry air.

| Operating Temp., °F. | Polymerization Tests Percent Propyene Conv., Hrs. | | | | | Polymer Analysis | | Physical Condition of Used Catalyst |
|---|---|---|---|---|---|---|---|---|
| | 5 | 10 | 20 | 30 | 40 | Wt. Percent 850° F. | MIBK insoluble at 200° F., Wt. Percent | |
| 190 | 94 | 88 | 45 | 20 | 8 | 10 | 10.2 | Spalled. |
| 220 | 95 | 92 | 72 | 52 | 44 | 16 | 7.3 | Good. |
| 245 | 91 | 79 | 28 | | | 27 | 5.1 | Good (20 hrs.). |

The maximum conversion and longest cycle length at high conversion were obtained at 220° F. The molecular weight of the polymer decreased, as shown by the increase in "850° F.–" polymer and decrease in MIBK insoluble polymer, as the temperature was increased from 190 to 245° F. About 25 percent of the catalyst used in the run at 190° F. was spalled or crumbled. Most of this catalyst disintegration occurred in the top (inlet) portion of the catalyst bed. The catalysts used in the runs at the higher temperatures remained in good physical condition.

Although higher conversion was obtained and less physical damage to the catalyst occurred at 220° F., polymer containing greater amounts of tacky and solid materials was produced at 190° F. operating temperature.

*Example XIII.—Effects of variation of propylene concentration*

The effects of propylene concentration in the feed upon conversion, polymer composition, and catalyst spalling were studied with feeds containing 4, 7, and 12.5 percent propylene. Results of these runs are shown in Table XV.

TABLE XV

Operation at 220° F., 600 p. s. i. g., and 2 L. H. S. V. of feed containing propylene, propane and isopentane over pelleted steam-aged 90 silica-10 alumina-chromium oxide catalyst activated at 1300° F. in dry air.

| Feed Mol Percent Propylene | Polymerization Tests Percent Propylene Conv., Hrs. | | | | | Polymer Analysis | | Physical Condition of Used Catalyst |
|---|---|---|---|---|---|---|---|---|
| | 5 | 10 | 20 | 30 | 40 | Wt. Percent 850° F. | MIBK Insoluble at 200° F. | |
| 4 | 95 | 88 | 54 | 28 | 16 | 19 | 5.8 | Good. |
| 7 | 95 | 92 | 72 | 52 | 44 | 16 | 7.3 | Good. |
| 12.5 | 94 | 86 | 59 | 40 | 24 | 14 | 6.2 | Spalled. |

Optimum conversion was obtained with the feed containing 7 mol percent propylene. The feed with higher propylene concentrations produced slightly heavier polymer. Catalyst spalling occurred when 12.5 percent propylene feed was used.

The polymer production for the 40-hour run using 12.5 percent propylene feed was 3.6 pounds of polymer per pound of catalyst as compared to 2.2 for the 7 percent propylene feed.

The tacky polymers of the invention have been found to be excellent viscosity index improvers. Examples XIV–XX indicate the utility and highly desirable qualities of the tacky polymers of the invention as VI improvers.

*Example XIV*

Table XVI presents data obtained on polypropylene as a VI improver.

TABLE XVI

| | Polypropylene | | |
|---|---|---|---|
| | VI | Vis. at 100° F.[1] | Vis. at 210° F.[1] |
| Solvent Refined Mid-Continent Oil | 100 | 119.8 | 41.04 |
| Same Oil+2% additive | 116 | 147.5 | 43.9 |
| Same oil+5% additive | 124 | 200.1 | 48.8 |
| Same Oil+13% additive | 130 | 414.8 | 68.3 |

[1] S.U.S.

*Example XV*

Table XVII shows pentene polymer produced with chromium oxide-silica-alumina catalyst is also a good VI improver.

TABLE XVII

| | Pentene Polymer | | |
|---|---|---|---|
| | VI | Vis. at 100° F.[1] | Vis. at 210° F.[1] |
| Solvent Refined Mid-Continent Oil | 100 | 119.8 | 41.0 |
| Same Oil+2% additive | 118 | 147.9 | 44.0 |
| Same Oil+5% additive | 130 | 201.5 | 49.5 |
| Same Oil+13% additive | 135 | 419.2 | 71.5 |

[1] S.U.S.

*Example XVI*

Polyisobutylene recovered from commercial VI improver was compared as to heat stability with the tacky polymer products of this invention. The commercial polyisobutylene used in the following tests is made by polymerizing isobutylene with boron fluoride-type catalysts. Its mean molecular weight is indicated to be of the order 4,000 to 10,000 by the manufacturer.

The polyisobutylene was recovered from commercial VI improver by the following procedure: The VI improver was completely dissolved in methylisobutylketone by heating to about 230° F. Upon cooling the solution to room temperature, the polyisobutylene precipitated out. The process was repeated on the polyisobutylene twice more. The polyisobutylene did not completely dissolve in the MIBK the last two times. The crude polyisobutylene thus obtained was washed with methyl alcohol, and was then dissolved in chloroform. The polyisobutylene was precipitated from the chloroform solution by the addition of methyl alcohol. The liquid was decanted, and the purified polyisobutylene was dried. Drying was accomplished in two ways, by heating in a vacuum oven at 212° F. for 8 hours and by storage in a vacuum dessicator at room temperature for several days.

Figure 4:
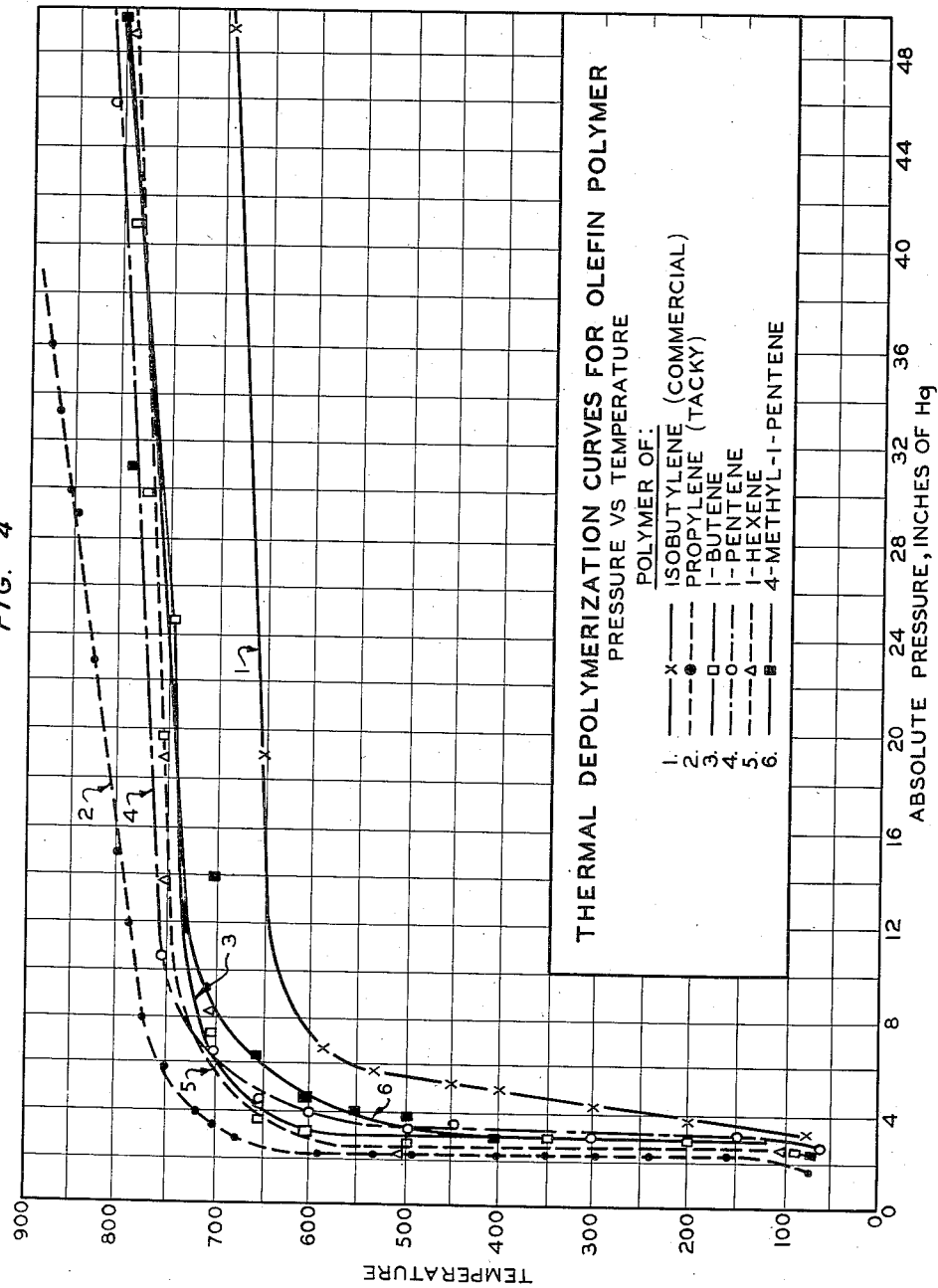
Figures 4 and 5 are thermal depolymerization curves obtained with polymers of this invention and polymers produced according to the prior art.

The data presented in Figure 4 were obtained by placing a sample of the polymer to be tested in a bomb and heating slowly. Pressure and temperature were measured at intervals. The polymers were all maintained at each temperature for comparable times before the pressure was read.

Figure 5:
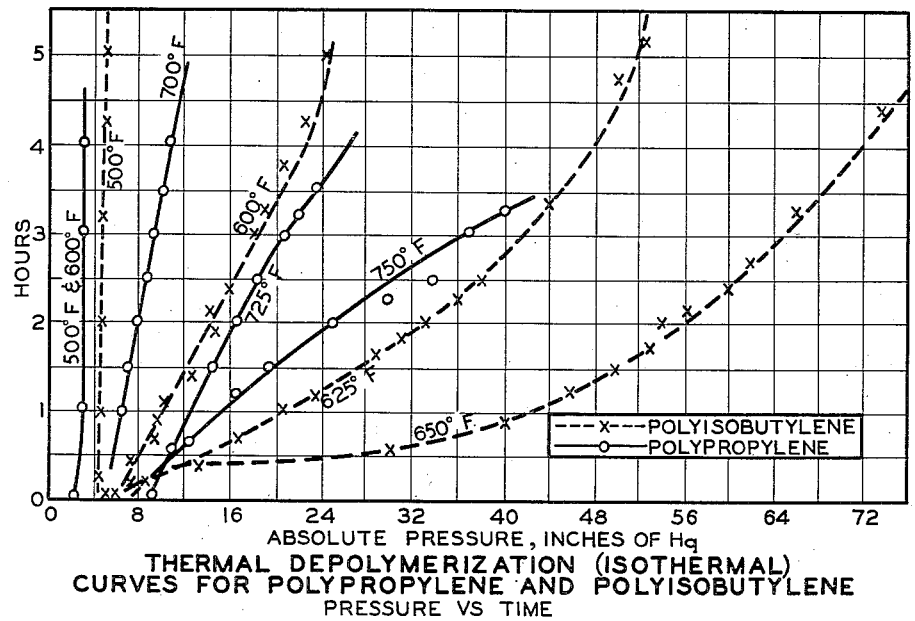

The data in Figure 5 were obtained by placing a sample of the polymer in a bomb and heating as rapidly as possible to the indicated temperature. The temperature was then maintained constant, and the pressure was read at intervals.

Figure 4 compares the stabilities of long-chain olefin polymers prepared in accordance with the invention over chromium oxide-silica-alumina catalyst with that of the polyisobutylene recovered from commercial VI improver. It will be seen from the figure that the commercial polyisobutylene is considerably less stable than are the polymers of this invention. Whereas the former began to decompose at about 600° F., the latter (polymers of propylene, 1-butene, 1-pentene, 1-hexene, and 4-methyl-1-pentene) began to decompose at about 700 to 725° F. A 1:1 copolymer of 1-hexene and 4-methyl-1-pentene, prepared over chromium oxide-silica-alumina catalyst, exhibited about the same stability as the polymer of 4-methyl-1-pentene.

A 1:1 copolymer of 1-butene and propylene and the fiber-like polymer of propylene, both prepared over chromium oxide-silica-alumina catalyst, exhibited stabilities about equal to those of the polymers of 1-butene and propylene (tacky polymer), respectively.

Figure 5 presents data obtained in tests designed to determine more exactly the decomposition temperatures of the commercial polyisobutylene and of the polypropylene of the subject invention. Upon interpolation of the data, the decomposition temperatures of polypropylene and of polyisobutylene are seen to be about 700° F. and 590° F., respectively. Examination of the figure also indicates that at equal rates of decomposition, the temperature of the polypropylene is some 110 to 125° F. higher than that for polyisobutylene.

Analysis of the gaseous products indicates that commercial polyisobutylene decomposes predominantly into isobutylene (70 percent of the gaseous products). The polymers produced over chromium oxide-silica-alumina catalyst showed no marked tendency to depolymerize into the original olefin monomer; in no case was the yield of the original monomer greater than 31 percent of the gaseous products.

*Example XVII*

This example illustrates the viscosity increase imparted to a lubricating oil by polymers of this invention as compared with those of the prior art.

Data for blends of "low temperature" 1-hexene polymer in SAE 20 finished lubricating oil stock are shown in tabular form below and in Figure 6. The 1-hexene polymer was prepared at 170° F. over heat-activated chromium oxide-silica-alumina catalyst prepared as previously described. The polymer was not concentrated before testing, i. e. the total polymer was used. Data for the polymer are shown in Table XVIII and are plotted as curve I on Figure 6.

TABLE XVIII

| Wt. Percent Polymer | SUS at 210° F. | VI |
|---|---|---|
| 0 | 54.0 | 96 |
| 1 | 57.1 | 101 |
| 3 | 65.9 | 111 |
| 5 | 76.5 | 116 |

Figure 6:
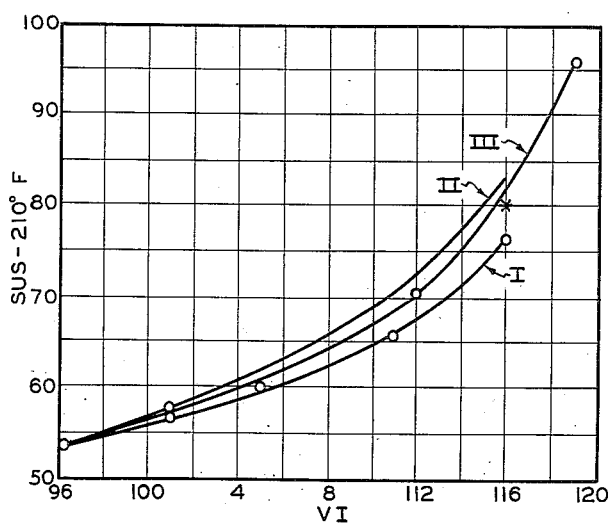
Figure 6 illustrates the relationship between viscosity index and viscosity at 210° F. for a lubricating oil containing polymers prepared according to this invention and for the same oil containing polymers prepared according to the prior art.

Data for blends of "high temperature" 1-hexene polymer in SAE 20 finished lubricating oil stock are shown in Table XIX and in Figure 6 as curve III. The polymer was prepared at 215° F. over chromium oxide-silica-alumina catalyst having the same composition and prepared by the same method as that used at 170° F. The polymer was concentrated by extraction with methylethylketone. The polymer was dissolved completely in MEK at 80° C. Upon cooling to room temperature, an insoluble phase, which amounted to 47.5 weight percent of the original polymer, was recovered by decantation. The insoluble material was again treated with MEK at 80° C., partial solution being obtained, after which the mixture was cooled to room temperature and decanted. The remaining polymer (used as VI improver) amounted to 32.2 weight percent of the original polymer. The oil recovered from the first MEK solution has a VI of 122 and a viscosity at 210° F. of 130.5 SUS.

TABLE XIX

| Wt. Percent Polymer | SUS at 210° F. | VI |
|---|---|---|
| 0 | 54.0 | 96 |
| 1 | 57.5 | 101 |
| 2 | 60.3 | 105 |
| 5 | 70.6 | 112 |
| 10 | 95.9 | 119 |
| 15 | 165.4 | 1 109 |

¹ Original polymer—no MEK extraction.

Data for commercial polyisobutylene are presented in Table XX and in Figure 6. These data, with the exception of one point, were taken from a generalized curve supplied by the manufacturer. Viscosity and VI of the base oil are taken into account by the graph. These data indicate a greater viscosity increase for the polyisobutylene than for either 1-hexene polymer. The single experimental point indicates about the same viscosity increase for the polyisobutylene as for the "high temperature" polymer, but still significantly higher than for the "low temperature" polymer.

TABLE XX

| SUS at 210° F. | VI |
|---|---|
| 57.5 | 101 |
| 71.0 | 111 |
| 84.0 | 116 |
| ¹ 80.5 | ¹ 116 |

¹ Experimentally determined for SAE 20 oil containing 9.5 weight percent commercial polyisobutylene.

An indication of the greater stability of blends of lubricating oil with "tacky polymer" over those with commercial polyisobutylene is found is the aluminum block test data presented in Table XXI. The base oil was SAE 20 finished stock having a VI of 96.

TABLE XXI

| | Base Oil | 95 wt. Percent Base Oil, 5 wt. Percent Polyisobutylene Solution ¹ | 98 wt. Percent Base Oil, 2 wt. Percent Propylene Polymer |
|---|---|---|---|
| Sample No | 7 | 9 | 10 |
| SUS at 100° F., new | 345.6 | 493.1 | 546.1 |
| SUS at 100° F., block sample | 369.9 | 506.4 | 557.6 |
| Percent Increase | 7.0 | 2.7 | 2.1 |
| Percent Naphtha Insoluble | 0.12 | 0.04 | 0.02 |

¹ 20 to 25 percent active ingredient.

Example XVIII

A sample of polypropylene, prepared by the polymerization of propylene over a chromium oxide-silica-alumina catalyst, was fractionated by molecular distillation and the specific gravity and viscosity index were determined on each fraction. The data are presented in Table XXII.

TABLE XXII

| Cut | Wt. Percent | Cum. Wt. Percent | Viscosity | | | | V. I. | Sp. Gr. 60/60 (° F.) |
|---|---|---|---|---|---|---|---|---|
| | | | SUS | | Centistokes | | | |
| | | | 100° F. | 210° F. | 100° F. | 210° F. | | |
| 1 | 6.7 | 6.7 | 89.36 | 38.04 | 18.46 | 3.56 | 68 | 0.8269 |
| 2 | 6.3 | 13.0 | 221 | 46.30 | 47.77 | 6.15 | 76 | 0.8335 |
| 3 | 6.9 | 19.9 | 767.8 | 67.92 | 166.19 | 12.42 | 61 | 0.8406 |
| 4 | 8.8 | 28.7 | 3,509 | 125.1 | 759.5 | 26.22 | 27 | 0.8474 |
| 5 | 6.9 | 35.6 | 7,349 | 209.3 | 1610.3 | 44.5 | 51 | 0.8501 |
| 6 | 6.6 | 42.2 | 15,292 | 326.2 | 3310 | 70.13 | 60 | 0.8552 |
| 7 | 3.3 | 45.5 | 11,744 | 306.2 | 2542 | 65.8 | 72 | |
| Btms | ¹51.8 | ¹97.3 | (²) | 3752 | (²) | 806.5 | | 0.8629 |
| Chg | | | 33,356 | 801 | 7221 | 179 | 102 | 0.8518 |

¹ Wt. percent bottoms determined by difference. The traps contained 2.7 wt. percent of the charge.
² Too viscous to measure.

It will be noted that the VI of the overhead fractions varied from 27 to 76 while the charge had a VI of 102. This apparent discrepancy is probably due to the VI-improving nature of the bottoms.

Example XIX

Another modification of the invention is a combination process comprising the steps of polymerizing propylene over nickel oxide-silica-alumina catalyst to produce a dimer containing 4-methyl-1-pentene, 4-methyl-2-pentene, 2-methyl-2-pentene and 1-, 2-, and 3-hexenes; fractionating this mixture to produce fractions of (1) 4-methyl-1-pentene, (2) 4-methyl-2-pentene, (3) 1-hexene and (4) 2- and 3-hexenes; isomerizing separately the 4-methyl-2-pentene and the 2- and 3-hexenes to the 1-isomers; combining these 1-isomers with 1-isomers originally produced, and polymerizing separately or co-polymerizing these 1-isomers (1-hexene and 4-methyl-1-pentene) over chromium oxide-alumina-silica catalyst. The 1-hexene polymer is a tacky transparent gel suitable for a viscosity-index improver. The 4-methyl-1-pentene polymer is a tough solid polymer suitable for a substitute for natural waxes. The propylene dimer is produced by the polymerization of propylene over nickel oxide-silica-alumina catalyst in accordance with U. S. Patent 2,606,940. The composition of the dimer is presented in Table XXIII.

TABLE XXIII

| Dimer | Volume Percent | B. P., ° F. |
|---|---|---|
| 4-methyl-1-pentene | 4 | 129 |
| 4-methyl-2-pentene | 51 | 138 |
| 2-methyl-2-pentene | 11 | 153 |
| 2-hexene and 3-hexene | 33 | 152-154 |
| 1-hexene | 1 | 145 |

These hexanes are fractionated into two fractions taking 4-methyl-1-pentene and 4-methyl-2-pentene overhead as one fraction and 2-hexene, 3-hexene and 2-methyl-2-pentene as the kettle fraction. The 4-methyl-2-pentene and 4-methyl-1-pentene fraction is then subjected to isomerization conditions at high enough temperatures to favor the shift of the double bond to the one-position followed by separation of 4-methyl-1-pentene as the overhead fraction. The higher boiling fraction is then recycled to the isomerization unit and the cycle repeated. Temperatures in the range of 500 to 850° F., and preferably 750 to 800° F., are required for the isomerization step.

Figure 3:
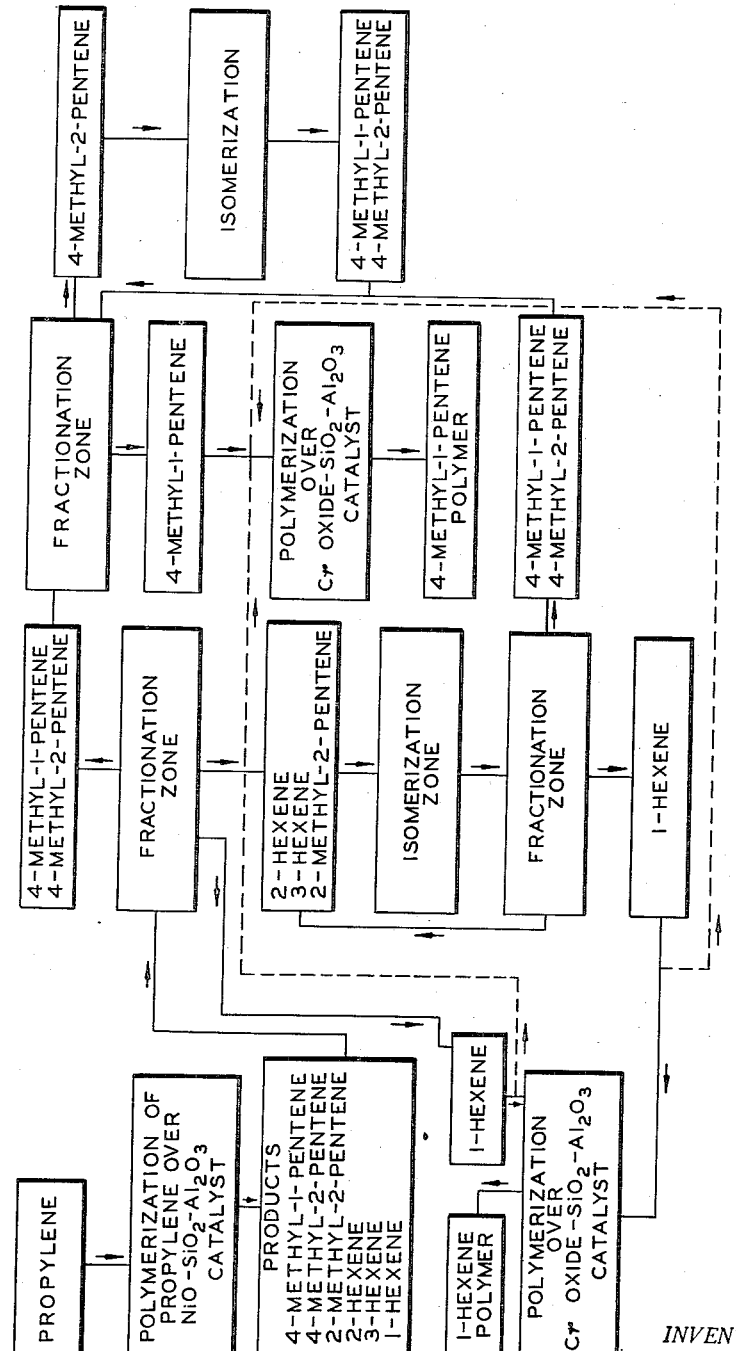
Figure 3 is a self-explanatory flow sheet illustrating the practice of this invention in connection with another type of polymerization process in which liquid polymers are the principal products.

The 2-hexene, 3-hexene, and 2-methyl-2-pentene cut is subject to isomerization conditions in a separate unit to produce 1-hexene which is separated as the lower boiling fraction. Isomerization of some of the 2-methyl-2-pentene to 4-methyl-1-pentene and 4-methyl-2-pentene is also effected and this fraction is removed as the low boiling cut and sent to the first isomerization separation unit. Figure 3 shows the process steps in diagrammatic form and is self-explanatory.

In the isomerization steps, undesired hexenes which form are removed to prevent excess build-up. Isomerization catalysts, such as brucite and bauxite, are useful.

The polymer produced from alpha-olefins over a chromium oxide-containing catalyst has a wide molecular weight range. The total polymer can be separated into three fractions, a liquid fraction, a tacky fraction, and a solid fraction containing material at the upper end of the molecular weight range. The separation may be carried out by a number of different methods, and the relative amount and the characteristics of the various fractions will depend somewhat on the method of fractionation used. Two methods of separation are currently used: (1) The total polymer is fractionated under vacuum to produce an overhead fraction having an end point, corrected to atmospheric pressure, of 850 to 900° F. The kettle material is then extracted with MIBK at a temperature somewhat above room temperature yielding as extract the tacky polymer and as raffinate the solid polymer. (2) The total polymer is subjected to extraction with pentane at room temperature, the solid fraction being insoluble. The pentane-soluble material is then extracted, usually twice, with MIBK at room temperature yielding an extract of normally liquid oil and a raffinate of tacky polymer. Method (1) produces considerably less oil and more tacky polymer than method (2). The oil produced by method (2) probably contains in solution some of the lower molecular weight tacky polymer. However, in the case of ethylene polymerization, only very small amounts of nonsolid polymer are produced.

Example XX

The material (propylene polymer) tested as a lube oil blending stock was prepared by method (2). The MIBK-soluble material comprised about 61.4 weight percent of the total polymer, and was tested as a lube oil blending stock without further treatment. This material, which has a viscosity of 1335 SUS at 210° F., was blended with a solvent refined Mid-Continent oil (39 SUS at 210° F.) in amounts of 10 and 18 percent propylene polymer which yielded SAE 20 and 30 blends, respectively. The SAE 10 stock and the two blends were tested by means of the well-known aluminum block test. In addition, the viscosity index of each was determined. The results are presented in Table XXIV.

TABLE XXIV

|  | SAE 10 (Original Oil) | SAE 20 Blend | SAE 30 Blend |
|---|---|---|---|
| Sample No | 8 | 11 | 12 |
| VI | 99 | 120 | 122 |
| Vis., New, SUS at 100° F | 123.7 | 242.4 | 402.0 |
| Vis., block sample, SUS at 100° F | 130.7 | 245.6 | 415.4 |
| Percent Vis. Increase | 5.1 | 1.3 | 3.3 |
| Percent Naphtha Insoluble | [1] 0.16 | 0.02 | 0.02 |
| Neut. No | 0.33 | 0.05 | 0.05 |

[1] A slight granular deposit in Sample 8 after 24 hours in the block indicates that the value shown for the naphtha insoluble is probably low.

Examination of the above data indicates that the addition of the propylene polymer oil to the base stock not only increased the VI markedly, but also imparted increased resistance to oxidation, as shown by the lower values for viscosity increase, naphtha insolubles, and neutralization number.

The weight average molecular weight of this tacky propylene polymer lies in the range of 500 to 5,000. The solid polymer fraction is insoluble in pentane at room temperature. The solid material has a melting point in the range of 240 to 300° F., a density in the range of 0.90 to 0.95, an intrinsic viscosity in the range of 0.2 to 1.0, and a weight average molecular weight in the range of approximately 5,000 to 20,000.

The polyethylene of the invention is principally a solid polymer having a freezing point in the range of 240 to 260° F., a density in the range of 0.92 to 0.99, ordinarily 0.95 to 0.97, an intrinsic viscosity in the range of 0.2 to 10, and a weight average molecular weight in the approximate range of 5,000 to 250,000. The melting point is determined from a cooling curve of temperature vs. time; actually, this is a freezing point, though generally termed melting point in the art.

The molecular weights mentioned herein are weight average molecular weights and were calculated according to the equation $$M = \frac{4.03 \times 10^3 \times N_i \times 14}{2.303} = 24{,}500 N_i$$

wherein M is the weight average molecular weight and $N_i$ is the inherent viscosity as determined for a solution of 0.2 gram of the polymer in 50 cc. of tetralin at 130° C. This type of molecular weight determination is described by Kemp and Peters, Ind. Eng. Chem. 35, 1108 (1943) and by Dienes and Klemm, J. Applied Phys., 17, 458 (June 1946).

A study and comparison was made between the polyethylene of the invention and nine commercial trademarked polyethylenes prepared by high-pressure (e. g. 1000-100,000 p. s. i.) polymerization. It was found that the polyethylene of the invention differs materially in melting point from commercial polyethylenes, its melting point being in the range of 240 to 260° F. Other polyethylenes had considerably lower melting points, the closest one melting at about 228° F. The density of our polyethylene is also higher than the density of other polyethylenes, the average density of several samples of our polyethylene produced in the fixed-bed modification of our process being 0.952 as compared with 0.936 for the highest density of any of these commercial polyethylenes tested. Another significant difference between our polyethylene and the commercial polyethylenes is in the Shore "D" hardness which is from 60 to 75 for our polyethylene as compared with 48 for the hardest of the commercial polyethylenes here tested.

The reason for the higher melting point, greater density, and hardness of our polyethylene as compared with the commercial polyethylenes appears to be due to the different type of molecule which is formed by the process of the invention in the presence of the chromium oxide catalyst.

A study was made of a large number of samples of our polyethylene by infra-red spectroscopy. The resulting spectrograms were compared with the spectrograms of commercial polyethylenes and it was observed that in every instance the major portion of the unsaturation in our ethylene polymer molecule was trans-internal and/or vinyl, while that of commercial polyethylene was of the branched vinyl type of unsaturation. The major portion of the unsaturation in all of our polypropylene samples tested and also in all of the other polymers made in accordance with our invention was found to be trans-internal and/or terminal vinyl. Trans-internal type of unsaturation is represented by the formula

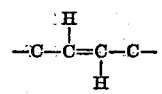

The terminal vinyl type of unsaturation is characterized by the structure —CH=CH$_2$. The vinyl group may be attached to the molecule either internally or terminally as represented, for example, by such formulas as:

and

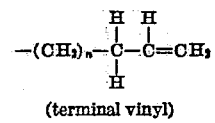

(terminal vinyl)

These structures are definitely different types of structures from those predominating in the polymers of the prior art, which have been found and are known in the literature to have the major portion of their unsaturation of the branched vinyl type, which may be illustrated, for example, by the structure

The characteristic of branched vinyl type of unsaturation is two hydrocarbon radical substituents attached to the same carbon atom of the "vinyl" group and two hydrogen atoms attached to the other carbon atom of the "vinyl" group. The trans-internal and/or terminal vinyl arrangement of the major portion of the unsaturation in all of our polymers studied by infra-red spectroscopy is probably due to the mechanism of our novel polymerization reaction in the presence of chromium oxide catalyst which is different from that utilized in the polymerization reactions of the prior art. The same type of unsaturation is found in all of our polymers, including copolymers such as ethylene-propylene copolymers. It is probably due to the mechanism by which the olefin units are built into large molecules which accounts for the position of the unsaturation of the molecule and also accounts for the different characteristics of the resulting polymer.

A comparison of the type of unsaturation, in double bonds per 1000 carbon atoms, possessed by our polyethylene produced in a fixed-bed process with that of two representative commercial polyethylenes is shown in Table XXV.

TABLE XXV

| Polymer | M. Wt. | $\begin{matrix} R_1 \phantom{xx} H \\ \phantom{x}C=C\phantom{x} \\ H \phantom{xx} R_2 \end{matrix}$ Trans-internal | $\begin{matrix} R_1 \phantom{xx} H \\ \phantom{x}C=C\phantom{x} \\ H \phantom{xx} H \end{matrix}$ Terminal Vinyl | $\begin{matrix} R_1 \phantom{xx} H \\ \phantom{x}C=C\phantom{x} \\ R_2 \phantom{xx} H \end{matrix}$ Branched Vinyl |
|---|---|---|---|---|
| Polyethylene "A" | 11,000 | 2.5 | 0.2 | 0.1 |
| Polyethylene "F" | 5,000 | 0.05 | 0.07 | 0.9 |
| Polyethylene "E" | 5,000 | 0.1 | 0.1 | 1.3 |

From the table, it is apparent that in polyethylene "A," which is a representative sample of our polyethylene, produced in a fixed-bed process, more than 89 percent of the unsaturation is trans-internal while in the commercial polyethylene "F," about 88 percent of the unsaturation is of the branched-vinyl type and in commercial polyethylene "E," about 86 percent of the unsaturation is of the branched-vinyl type. Some of our polyethylenes have predominantly terminal vinyl unsaturation, especially when produced at relatively low temperatures with a mobile catalyst.

In considering the concept of molecular weight, as applied to a polymer of the type here involved, it must be remembered that such a polymer is a mixture of compounds and not a pure compound. It contains some polymer molecules having actual molecular weights as low as a few hundred and some having actual molecular weights probably of the order of a million or more. In addition there are many molecules of molecular weight intermediate the foregoing values. Therefore, when the term "molecular weight" is applied to a polymer, it is an effective or resultant molecular weight that is meant. In correlating molecular weight with other properties, the molecules having different weights are found to affect different properties to different extents. Thus a particular molecular species having a particular molecular weight may effect a particular property to an extent which is much greater or much less than would be indicated merely by the frequency of occurrence of that species in the polymer. If, however, the property in question is one which is affected chiefly by the number of molecules present in a given weight of polymer, then a particular molecular weight species will affect that property merely in proportion to the number of frequency of occurrence of that species.

When the property in question is viscosity, the high molecular weight molecular species affect viscosity to an extent far greater than their mere number or frequency of occurrence in the polymer would indicate. In other words, in a polymer containing both high and low molecular weight molecules, the high molecular weight molecules have a vastly greater effect on the viscosity of the polymer or of solutions thereof than their mere frequency of presence in the polymer would indicate; i. e., a few very large molecules affect viscosity more than do many small ones. Viscosity appears to be more nearly related to weight percent than to mol percent of large molecules in the polymer. Thus the effective molecular weight based on viscosity measurement emphasizes the presence of large molecules in the polymer proportionately more than it does the presence of small ones. As a practical matter, this molecular weight correlates usefully with many properties of the polymer which are of practical importance. Therefore, unless otherwise specified, the term "molecular weight" as used herein means molecular weight based on viscosity measurement.

When the property in question depends upon the number of molecules of a given molecular weight per unit weight of polymer, as, for example, when the vapor pressure depression or boiling point elevation of a solvent in which the polymer is dissolved is considered, all different species of molecular weight have more nearly the same effect, and a molecular weight based on such a property gives roughly the same effective importance to all molecular weight species and directly reflects the simple numerical frequency of every species present. An effective molecular weight calculated from such a property has approximately the value which would be obtained if the total number of molecules could be counted and individually weighed (using ordinary molecular weight units) and the total of all of the molecular weights were divided by the total number of molecules. For this reason the molecular weight based on solvent boiling point elevation, or obtained by an isopiestic method utilizing as a standard of reference a solution of a substance of known molecular weight in the same solvent in which the polymer sample is dissolved, is termed a "number average molecular weight." The number average molecular weight is usually quite different numerically from the effective molecular weight determined by viscosity measurement. Thus one polyethylene prepared by our process had a number average molecular weight of 1800 and a viscosity effective molecular weight of 20,000; another had a number average molecular weight of 5600 and a viscosity effective molecular weight of 42,600. Although the effective molecular weights have different numerical values, each has its own particular utility. The utility of the viscosity molecular weight has been pointed out. That of the number average molecular weight is important in interpreting data indicating molecular structure, especially the number of methyl groups and the number of double bonds per thousand carbon atoms. For example, it is evident that a normal paraffin containing 1000 carbon atoms per molecule has 2 methyl groups per 1000 carbon atoms whereas a normal paraffin having 500 carbon atoms per molecule has 4 methyl groups per 1000 carbon atoms, since there is one methyl group at each of the two ends of each molecule. Here it is the number of each molecular weight species that is important and number average molecular weight is needed in order that the number of methyl groups per 1000 carbon atoms (measured by infra-red spectrographic analysis) be properly interpreted. The conclusions herein relating to molecular structure are based, to an appreciable extent, on the number average molecular weight in conjunction with infra-red spectral data.

Special unique properties are possessed by polyethylenes produced according to our process utilizing a particulate, suspended or mobile catalyst, preferably with mechanical agitation, a temperature in the range 250 to 350° F., a solvent such as isooctane, cyclohexane, or methylcyclohexane, and superatmospheric pressure sufficient to maintain the solvent or diluent substantially in the liquid phase. This is the type of process described in connection with Figure 2. Polyethylene prepared in this manner is characterized by molecular weights (based on viscosity measurement) in the range 25,000 to 100,000, an excellent combination of stiffness and flexibility, smooth surface, white color, and good extrudability. These polyethylenes according to our invention have crystallinities of 90 percent and higher, a total unsaturation of from about 0.5 to about 10, frequently 1 to 5, double bonds per 1000 carbon atoms, and densities of at least 0.95 and generally in the range 0.95 to 0.99, usually at least 0.96 and frequently about 0.97. Less than 5 percent, and usually less than 2 percent, and frequently substantially none, of the total number of double bonds are in so-called "branched vinyl" structures, and at least 80, and ordinarily at least 90, percent of the double bonds are in the form of vinyl groups at the end of long, straight paraffinic carbon chains, as illustrated by the formula $$R_s-\overset{H}{\underset{|}{C}}=\overset{H}{\underset{|}{C}}-H$$

where $R_s$ is a straight-chain alkyl radical, i. e. a straight-chain radical composed of carbon and hydrogen according to the formula $C_nH_{2n+1}$ where $n$ is an integer. The molecules of these polymers have substantially unbranched carbon-chain structure, as shown by their infrared absorption spectra, which indicate that these polymers contain less than 5, often less than 2 and in many instances less than 1.5, methyl groups per thousand carbon atoms. They contain fewer methyl groups per thousand carbon atoms than any other known polyethylene having a molecular weight on the same order of magnitude. Our polyethylenes are further characterized by high crystallinities, i. e. at least 90 percent. The high crystallinity is consistent with the relatively high density and the straight-chain structure of these polymers. Characteristic properties of polyethylenes produced according to our invention utilizing a slurry of chromium oxide-silica-alumina catalyst (about 2.5 wt. percent total Cr, about 2 wt. percent hexavalent Cr) in a saturated hydrocarbon solvent at temperatures of from 200 to 350° F. and sufficient pressure to maintain the solvent substantially in the liquid phase are shown in Table XXV-A wherein properties of polyethylenes made by other processes are also shown. This table includes properties of a polyethylene made in a fixed-bed modification of our process as previously described.

They represent the percentage by weight of the total polymer which is crystalline rather than amorphous.

The total unsaturation is determined from the infrared spectrogram.

The small total number of methyl groups per 1000 carbon atoms in our polymers indicates the straight-chain or unbranched character of the molecules of our polymers. The value 16 methyl groups per 1000 carbon atoms in the case of the third polyethylene in Table XXV-A, in view of the low number average (not given in table) molecular weight is substantially entirely accounted for by terminal methyl groups.

Certain of the polyethylene samples used for the determination of the data shown in Table XXV-A were pressed solid films ranging in thickness from 250 to 500 microns, whereas the others were in the form of 70 to 500 micron depths of liquid at 275° F. Solid films were used for all of the crystallinity determinations.

Figure 7:
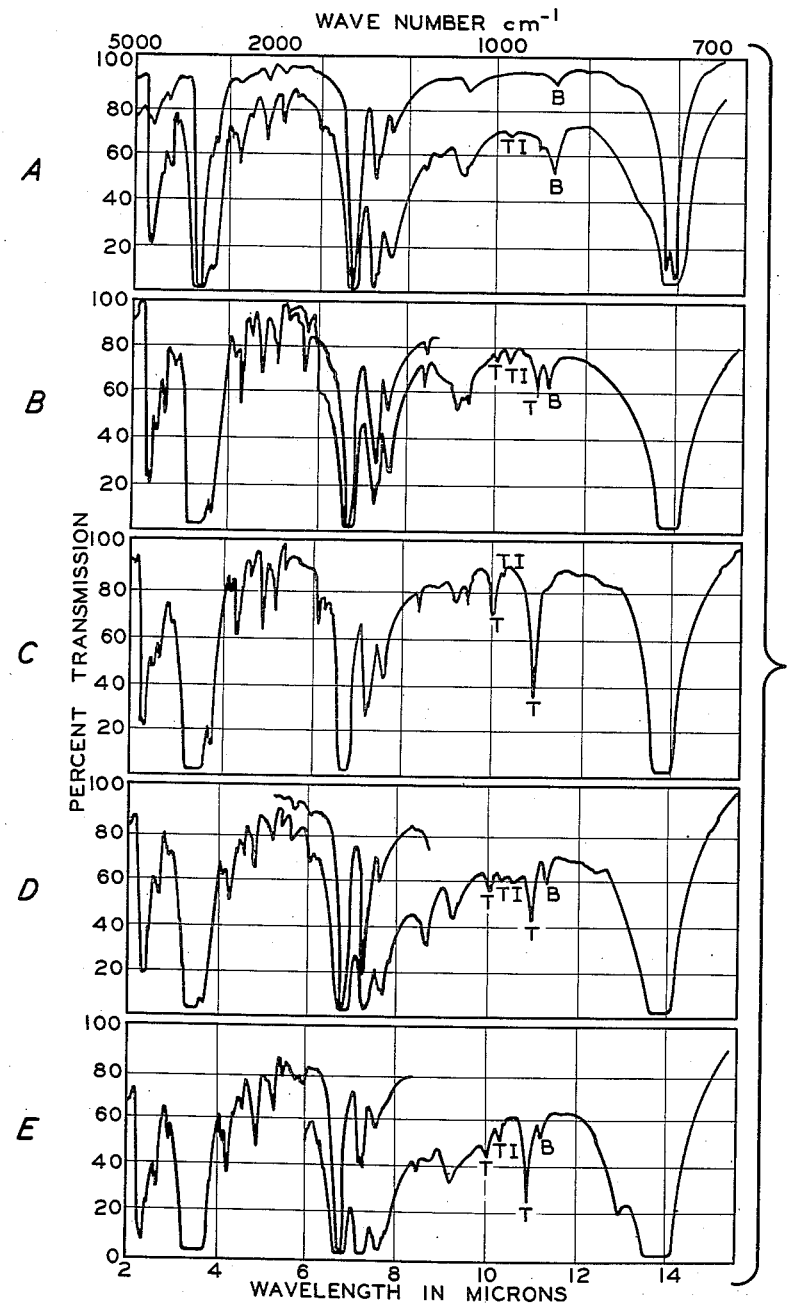
Figure 7 shows infra-red absorption spectra of three polymers according to this invention in comparison with corresponding spectra of two other polymers.

Figure 7 shows comparative infra-red spectrograms of five different polymers. A is the spectrogram of a typical prior art polyethylene made by high-pressure polymerization in the presence of a peroxide-type catalyst. B is the spectrogram of a polyethylene made by polymerization in the presence of an organometal catalyst. C is the spectrogram of a polyethylene prepared according to our invention by polymerization in the presence of a chromium oxide-silica-alumina catalyst containing about 2.5 weight percent total chromium in the form of oxide, about 2 weight percent hexavalent chromium, and the remainder coprecipitated silica-alumina gel having a silica to alumina weight ratio of 9:1, the polymerization having been conducted at about 300° F. in the presence of cyclohexane diluent in the liquid phase, in which the catalyst was suspended to form a slurry, to obtain a polymer having a molecular weight of about 40,000. D is the spectrogram of an ethylene-propylene copolymer prepared ac-

TABLE XXV-A

| Preparation | Molecular Weight | Crystallinity, Percent | Total Unsaturation double bonds per 1000 C atoms | Total CH₃ Groups per 1000 C atoms | Unsaturation Type, Percent of total unsaturation | | |
|---|---|---|---|---|---|---|---|
| | | | | | Terminal Vinyl $R_s-\overset{H}{C}=CH_2$ | Trans Internal $R_s-\overset{H}{C}=\overset{}{\underset{H}{C}}-R'$ | Branched Vinyl $\overset{R'}{\underset{R}{\diagdown\diagup}}C=CH_2$ |
| Cr oxide catalyst (this invention, 250-325° F., slurry catalyst). | | | | | | | |
| Sample 1 | ¹ 42,550 | 93 | 1.4 | 2±2 | 96±2 | 4±2 | <2 |
| Sample 2 | ¹ 42,800 | 94 | 1.5 | 2±2 | 94±2 | 6±2 | <2 |
| Cr oxide catalyst (this invention, 300-375° F., fixed-bed catalyst) | 20,000 | 92 | 4.8 | 16±2 | 7±2 | 93±2 | <1 |
| High-pressure polymerization: | | | | | | | |
| Sample 1 | 20,000 | 65 | 0.6-0.7 | ² 20±2 | 15±10 | 15±10 | 70±10 |
| Sample 2 | 20,000 | 64 | 0.5-0.6 | | 15±10 | 15±10 | 70±10 |
| Organic Catalyst | ¹ 46,000 | 86 | 0.7 | 3±2 | 30±10 | 30±10 | 25±10 |
| Inorganic catalyst other than Cr Compound: | | | | | | | |
| Sample 1 | 178,000 | 82 | 0.4-0.5 | 2±2 | 60±15 | 40±15 | <5 |
| Sample 2 | 149,000 | 83 | 0.6-0.7 | 2±2 | 35±15 | 65±15 | <5 |
| Sample 3 | 182,000 | 79 | 0.3 | 2±2 | 5 | 100±15 | <5 |

¹ Estimated from empirical correlation of melt index with molecular weight.
² Ethyl groups.

The foregoing data show that our polyethylenes prepared in the presence of a mobile (slurry) catalyst have higher crystallinity, higher total unsaturation, and a greater proportion of their unsaturation in the form of terminal vinyl groups than the other polyethylenes tested.

The crystallinity values in Table XXV-A are determinable by the X-ray diffraction method of Matthews, Peiser, and Richards, Acta Cryst. 2, 85 (1949), utilizing a North American Philips Diffractometer, a Geiger-Mueller detector, and strip chart recording and are duplicatable by infra-red and by nuclear resonance methods.

cording to this invention under conditions similar to those for the preparation of the polyethylene represented by C, except that the ethylenepropylene weight ratio in the feed was about 4:1. E is the spectrogram of a copolymer of ethylene and 1-butene (4:1 ratio) prepared under similar conditions according to this invention.

In the curves shown in Figure 7, the minima represent selective absorption of infra-red radiation at the corresponding wave lengths. The magnitude and the wave lengths corresponding to these minima can be used to characterize and distinguish different types of molecules from each other. The minima at about 3.8 and about 6.8 microns are characteristic of carbonhydrogen bonds and are shown by all hydrocarbons. The broad minima at about 14 microns are characteristic of five or more methylene ($-CH_2-$) groups joined in sequence and are shown by all of the polyethylenes and by the copolymers. There are, however, marked differences among the spectra, which differences are indicative of differences in molecular structure. Terminal vinyl groups selectively absorb infra-red radiation at 10.1 and 11.0 microns. These are indicated by minima designated T. It is clear that our polymers C, D, and E, especially C, exhibit these minima far more markedly than do polymers A and B. "Branched vinyl" groups absorb selectively at 11.25 microns. These minima are designated B in Figure 7. They are quite prominent in prior art polyethylene A, evident in polyethylene B, substantially absent from our polyethylene C, and present to a minor extent, relative to minima characteristic of other types of unsaturation, in our copolymers D and E. Trans-internal unsaturation is characterized by selective absorption at 10.35 microns, indicate as TI in Figure 7.

The minima at 7.25 (almost absent from C) are characteristic of methyl groups. For a given molecular weight and a given percentage unsaturation the number of methyl groups is indicative of the degree of chain branching. The low number of methyl groups (see Table XXV-A) in our polyethylenes at a given molecular weight is highly indicative of a substantially unbranched structure.

Certain of the spectrograms in Figure 7 contain two curves. These represent solid film samples of different thicknesses. Thus the sample used to obtain the upper curve in A was 169 microns thick, and the lower curve represents a sample 347 microns thick. The sample thicknesses in B were 225 (upper) and 400 microns (lower). The single sample used to obtain C was 350 microns thick. Those used in D were 105 (upper) and 440 microns (lower) in thickness. Those in E were 101 (upper) and 674 microns (lower) in thickness.

The foregoing data show that our polyethylene is fundamentally different, in the molecular structure, from those of the prior art.

In addition to the properties discussed hereinbefore, our polyethylenes prepared by the use of a slurried catalyst, as described herein, have a tensile strength of the order of 4000 p. s. i. and higher, an elongation at break of from 10 to 40 percent (crosshead speed, 20 inches per minute), an impact strength from about 1.5 to about 3, a Shore hardness of from about 65 to about 70, a stiffness of at least about 140,000 p. s. i., a brittleness temperature below about $-150°$ F. and usually below about $-180°$ F. and a softening temperature of at least 250° F. and usually 260° F. or higher. They have a low permeability to gases and vapors and can be rolled, drawn, or blown to form film which is useful for the preservation of foods and other perishable goods. They can also be coated on wire as insulation.

We have further found that highly crystalline (above 80 percent crystallinity) normally solid polymers can be obtained by extracting polymers produced according to this invention, including the fixed-bed and mobile-catalyst embodiments thereof, with common organic solvents such as isopentane, normal pentane, chloroform, benzene, methyl isobutyl ketone, cyclohexane, normal heptane and similar, relatively low-boiling solvents at temperatures from about 50° F. up to the normal boiling point of the solvent and recovering the undissolved portion. The crystalline fraction of such a polymer is insoluble whereas the amphorous fraction is soluble in the solvent under such conditions. Crystalline polymers of propylene, of 1-butene, of 1-pentene, and of 4-methyl-1-pentene can thus be obtained. Those of propylene are characterized by selective absorption of infra-red radiation at certain wave lengths of about 7.7, 7.9 to 8.0, 8.5 to 8.6, 9.1, 9.6, 10.0 to 10.1, 10.3, 10.6 to 10.7, 11.1, and 11.9 microns. These polymers, and crystalline polymers of propylene and higher-boiling olefins in general are described in more detail in our copending application Serial No. 558,530, filed January 11, 1956. These polymers are also characterised by the constant recurrence, in their molecules, of definite and certain atomic groupings in which the substituent groups (e. g. methyl and other side groups or chains) are oriented according to a definite pattern.

*Example XXI*

A series of runs was conducted in which mixtures of ethylene and propylene were copolymerized in the presence of a catalyst comprising grom 4.5 to 5 weight percent chromium oxide deposited on a coprecipitated gel carrier consisting of 90 weight percent silica and 10 weight percent alumina. The catalyst was prepared by impregnating the carrier with an aqueous solution of chromic acid, drying, igniting to form chromium oxide, and heating in anhydrous air for about 6 hours at about 950° F.

All of the runs were conducted at 270° F., 450 p. s. i., and a liquid hourly space velocity of 4.5. The feed to the reactor, which contained a fixed bed of the catalyst, consisted of 99 weight percent 2,2,4-trimethylpentane and 1 weight percent of the olefin mixture. The following results were obtained for that fraction of the total polymer which was insoluble in 2,2,4-trimethylpentane at room temperature:

TABLE XXVI

*Ethylene-propylene copolymerization*

| Run Number | 10 | 13 | 1 | 4 | 6 |
|---|---|---|---|---|---|
| Weight Ratio, $C_2H_4/C_3H_6$ | 90/10 | 85/15 | 80/20 | 75/25 | 60/40. |
| Percent Total Olefin Conversion | 98 | 94 | 93 | 93 | 84. |
| Weight Percent Converted Olefin to: | | | | | |
|   Solid Polymer | 74 | 64 | 68 | 59 | 42. |
|   i-$C_8$ soluble polymer | 8 | 22 | 22 | 30 | 50. |
|   Catalyst deposits | 18 | 14 | 10 | 11 | 8. |
| Solid Polymer: | | | | | |
|   Impact strength (Izod), ft.-lbs | 0.660 | 0.843 | 0.957 | 1.216 | 1.89. |
|   Tensile strength of injection molded sample lb /sq. in | 2587 | 2415 | 2171 | 1910 | 1957. |
|   Shore "D" Hardness | 55 | 56 | 50 | 51 | 55. |
|   Molecular Weight | 25,550 | 25,210 | 24,500 | 25,300 | 26,300. |
|   Rating (flexibility) | brittle. | can be bent but cracks when bent 180°. | can be bent 180° several times. | same as 1. | can be bent 180° many times without breaking or cracking. |

The foregoing data show that, when the propylene content of the olefin feed was less than about 15 weight percent under the stated conditions, the resulting copolymer was brittle, and that when 40 percent propylene was present in the olefin feed, a polymer having much greater flexibility was obtained. It is evident that the conversion efficiency decreases with increasing propylene content. When the propylene content of the feed is above 45 percent, based on total olefin in the feed, the efficiency is still lower than the values shown in Table XXVI and the product more nearly resembles polypropylene.

Example XXII

A mixture containing ethylene and propylene in an 80:20 weight ratio dissolved in 2,2,4-trimethylpentane (1 percent solution) was copolymerized at a temperature of 270° F. over a chromium oxide-silica-alumina catalyst (prepared as in Example XXI) containing 5 weight percent chromium as chromium oxide, the feed containing one percent by weight olefins in the isooctane. The ethylene-propylene copolymer obtained had a melting point of 236° F., a density of 0.930, inherent viscosity of 0.987, and a melt index of approximately 12. A film was prepared from this polymer by extruding it on a Modern Plastics 1½ inch extruder. For comparative purposes, a film was prepared from a commercial polyethylene (melting point up to 228° F., density 0.914 to 0.918), and two films were prepared from blends of the commercial polyethylene with a solid polymer of ethylene alone obtained by polymerization of ethylene over a chromium oxide-silica-alumina catalyst and having a melting point of 244° F., a density of 0.961, and an inherent viscosity of 0.585. Tensile strength, elongation, tear strength, and moisture-vapor transmission were obtained on each of the four films. Results were as follows:

chromium oxide. Operating conditions were 250° F., 450 p. s. i., 4.5 L. H. S. V., 2 weight percent total olefin in feed, and 10-hour operation utilizing a suspended catalyst (stirred) in a continuous flow reactor. The concentration of propylene in the olefin feed was varied from zero to 20 weight percent. The data are shown in tabular form below. The percentage of fines in that weight percent of the total catalyst, after the runs, which was finer than the original catalyst.

TABLE XXVIII

| Wt. Percent Propylene in Olefin Feed | Conv., Percent | M. P. | d | M. W. | Falling Ball, in. | Cat. Spalling, Percent Fines |
|---|---|---|---|---|---|---|
| 0 | 82 | 249 | 0.960 | 29,500 | 24 | 4.6 |
| 5 | 85 | 243 | 0.948 | 27,900 | 36 | 0.7 |
| 10 | 84 | 239 | 0.938 | 25,200 | 72 | 0.2 |
| 15 | 79 | 237 | 0.937 | 30,900 | 72 | 0.5 |
| 20 | 79 | 236 | 0.932 | 26,000 | 72 | 1.4 |

From the above data, it is evident that, under the conditions of these runs, when the propylene concentration in the feed was 10 percent or higher, the polymer properties differed markedly from those of the homopolymer, and the differences increased with increasing concentration. Furthermore, it is evident that the addition of the first 5 to 10 percent of propylene to the olefin feed

TABLE XXVII

| Type of Film | Tensile Strength p. s. i. | | Elongation, Percent | | Tear Strength [2] | | Moisture-Vapor Transmission [3] |
|---|---|---|---|---|---|---|---|
| | T. D.[1] | M. D.[1] | T. D. | M. D. | T. D. | M. D. | G/mil/100 sq. in./24 hours |
| Ethylene/propylene copolymer | 1245 | 1050 | 20 | 6.2 | 197 | 169 | 0.53 |
| Commercial Polyethylene | 2060 | 1956 | 528 | 464 | 163 | 166 | 1.11 |
| 20/80 Blend Ethylene Polymer/commercial polyethylene | 1387 | 1568 | 265 | 152 | 195 | 160 | 0.67 |
| 30/70 Blend Ethylene Polymer/commercial polyethylene | 1688 | 1497 | 214 | 70 | 186 | 135 | 0.59 |

[1] T. D. represents transverse direction; M. D. represents direction of extrusion or "machine direction".
[2] ASTM D 1004-49T. Calculation in grams/mil thickness.
[3] ASTM D 697-42T (Method B). A modification of this method was used with a Payne permeability cup being employed instead of a standard cup. In the Payne permeability cup, the area exposed is 10 sq. cm. as compared to 30 sq. cm. for the standard cup. Runs were made at 100° F. instead of at room temperature.

The foregoing data show that the process of this invention produces a film which is superior to commercial polyethylene as regards moisture-vapor transmission and tear strength.

The films in this example were prepared by utilizing an extrusion apparatus manufactured by the Modern Plastics Machinery Corporation, 15 Union Street, Lodi, New Jersey. The machine effects film formation on the principle of feeding a ground polymer at a temperature above its softening point through an annular die and injecting air into the extruded annular film to form an inflated film. The inflated film can be recovered without further treatment or can be passed between a pair of rollers. It is, however, within the scope of the invention to utilize other known means for producing films.

Example XXIII

Five runs were made in which ethylene was polymerized over chromium oxide-silica-alumina catalyst prepared as in Example XXI, containing 4.5 to 5.0 weight percent markedly reduced catalyst spalling, as measured by the amount of fines, and increased the conversion; further addition of propylene resulted in little, if any, further decrease in catalyst spalling.

Example XXIV

Several runs were made in which small amounts of ethylene were added to a propylene feed to a polymerization stepp according to this invention. Comparative runs were made in which no ethylene was added to the propylene feed. The feed had the following composition in weight percent:

Total olefins _____ 4.5
Propane _____ 5.
2,2,4-trimethylpentane _____ 91

The feed was contacted with a fixed bed of catalyst containing 2.5 weight percent chromium as chromium oxide. The catalyst was prepared as in the preceding examples and activated in anhydrous air at 950° F.

The polymerization was conducted at a pressure of 600 p. s. i. and a liquid hourly space velocity of 2. The duration of each run was 12 hours. The following data were obtained:

TABLE XXIX

| Propylene-Ethylene Wt. Ratio | Polymerization Temp., °F. | Conversion, Percent | Polymer Composition, Wt. Percent | | | Spalling of Catalyst |
|---|---|---|---|---|---|---|
| | | | 850° F. E. P. | Tacky | Solid | |
| 10:1 | 190 | 89 | 6.5 | 58.9 | 34.6 | Very slight. |
| 10:1 | 220 | 89 | 13.0 | 61.8 | 25.2 | None. |
| 10:1 | 250 | 84 | 18.0 | 62.3 | 19.7 | Do. |
| No ethylene | 190 | 81 | 12.0 | | | Appreciable. |
| No ethylene | 220 | 90 | 15.0 | 64.0 | 21.0 | Slight. |
| No ethylene | 250 | 64 | 17.0 | 64.0 | 19.0 | None. |
| 1:1 | 220 | 90 | 4 | 49 | 47 | Severe. |

The data show that spalling is more marked at the lower polymerization temperatures and that the spalling is reduced by the presence of small amounts of ethylene, which also tend to increase the olefin conversion per pass.

*Example XXV*

This example illustrates the production, according to this invention, of flexible polyethylene in a continuous flow system.

The catalyst had a maximum particle size of about 20 mesh. It was prepared by the use of a crushed, commercial silica-alumina cracking catalyst which contained 90 percent silica and 10 percent alumina in the form of a coprecipitated gel. The crushed, coprecipitated gel was immersed in an aqueous solution of chromium trioxide, and the resulting solid composite was separated from the liquid and drained. It was then dried by heating at 500° F. in a stream of air having 0° F. dew point and was finally activated by heating in a stream of air (0° F. dew point) at 925 to 960° F. for 5 hours. The resulting catalyst contained 2.34 weight percent total chromium as chromium oxide. The hexavalent chromium content was 2.00 weight percent.

The catalyst was suspended in a stream of 2,2,4-trimethylpentane as the diluent and passed into a reactor provided with a stirrer. Ethylene was passed into the reactor at the same time. An effluent was withdrawn from the reactor and contained suspended catalyst, solvent and polymer, as well as small amounts of unreacted ethylene. Additional diluent (2,2,4-trimethylpentane) was added to the effluent, and the resulting mixture was passed to a tank having a vent valve through which unreacted gas was vented. The remaining material was heated to dissolve the polymer and the resulting mixture was passed through a filter to remove the catalyst. The polymer was recovered from the resulting liquid by vaporization of the diluent. Table XXX shows the reaction conditions in two separate runs.

TABLE XXX

| Run Number | I | II |
|---|---|---|
| Feed Rates: | | |
| Ethylene, std. cu. ft./hr | 80 | 85 |
| Isooctane, lb./hr | 26 | 23 |
| Catalyst, lb./hr | 0.22 | 0.22 |
| Diluent addition to effluent, lb./hr | 24 | 29 |
| Vent gas removal rate, cu. ft./hr | 30 | 25 |
| Reaction temperature, ° F | 260 | 260 |
| Reaction pressure, p. s. i | 420 | 420 |
| Polymer in effluent, wt. percent | 3.6 | 5.4 |

Table XXXI shows the properties of the product polyethylene.

TABLE XXXI

| Run Number | I | II |
|---|---|---|
| Volatile Matter, Wt. percent | 0.04 | 0.14 |
| Melting point, °F | 247 | 248 |
| Density | 0.962 | 0.966 |
| Softening point, °F | 262 | 261 |
| Molecular weight | 44,000 | 47,000 |
| Melt Index | 0.640 | 0.356 |
| Tensile, p. s. i.: | | |
|   Injection-molded sample | 4,870 | 5,308 |
|   Compression-molded sample | 3,260 | 4,196 |
| Elongation, percent: | | |
|   Injection-molded sample | 22 | 19 |
|   Compression-molded sample | 12 | 19 |
| Hardness, Shore "D" | 68–70 | 68–70 |
| Flex. Temp., °F | +76 | +72 |
| Impact, IZOD | 2.46 | 2.31 |
| Heat Distortion, °F | 163 | 165 |
| *Tensile, p. s. i.: | | |
|   M. D | 3,108 | |
|   T. D | 530 | |
| *Elongation, percent: | | |
|   M. D | 25 | |
|   T. D | 1 | |
| *Tear, gm./mil.: | | |
|   M. D | 597 | |
|   T. D | 91 | |
| *MVT-gm./100 sq. in./24 hr | 0.45 | |

*Blown film, about 2 mils thick.

The volatile matter reported in the foregoing tabulation was determined by heating a sample of the product polyethylene at from 70 to 80° F. in a vacuum oven to constant weight and determining the weight loss. This ordinarily requires a heating period of from 10 to 15 hours.

The melting point was determined by melting a sample of the polymer and allowing it to cool slowly, the temperature being plotted against time, to obtain a cooling curve. The temperature corresponding to a plateau in the cooling curve was taken as the melting point.

The density was determined at 23±1° C. by immersion in a solvent having a density equal to that of the polymer, a Westphal balance being utilized.

The softening point was determined by the use of a Goodrich plastometer as described by Karrer, Davies and Dieterich, Industrial and Engineering Chemistry, Analytical Edition, 2, 96–99 (1930). On the plasticity curve (temperature v. softness) obtained according to the published method, the point at which the tangent to the curve had a slope of 60° was determined and the corresponding temperature was read on the temperature axis.

The molecular weight was determined as previously described herein.

The melt index was determined by ASTM method D–1238–52T.

The tensile strength and the elongation were determined by ASTM method D–638–52T for the injection-molded samples and by ASTM method D–412–51T for the compression-molded samples. The Shore hardness was determined by ASTM method D–676–49T.

The flex temperature was determined by ASTM method D–1043–51.

The impact strength was determined by ASTM method D–256–47T.

The heat distortion was determined by ASTM method D–648–45T.

The film properties were determined by methods previously cited herein.

As a general rule, the use of a stirred reactor and a suspended catalyst permits practical operation at lower temperatures and produces a relatively flexible polyethylene having a high molecular weight, whereas the use of a fixed or stationary catalyst mass often requires a higher temperature and produces a relatively brittle polyethylene having a relatively low molecular weight. Within the disclosed ranges, however, higher temperatures favor production of brittle polyethylene having relatively low molecular weight, and lower temperatures favor production of relatively flexible polyethylene having relatively high molecular weight. High catalyst activation temperatures favor lower molecular weights, and vice versa. Thus, even when a stirred reactor and a suspended catalyst are utilized, relatively brittle polyethylene (m. wt. 10,000–20,000) can be produced at temperatures in the range 350 to 450° F. and/or by using a catalyst which has been activated by heating in air at a temperature in the range 1100 to 1500° F. The same type of contacting technique conducted at a temperature in the range 200 to 350° F. with a catalyst activated at 900–1100° F. produces a relatively flexible polyethylene having a molecular weight in the range 20,000 to 200,000. Also, above 1 weight percent, low chromium content in the catalyst favors the formation of low molecular weight, brittle polymer, and high chromium content favors the formation of high molecular weight flexible polymer. High concentrations of monomer in the reaction zone favor production of high molecular weight polymer. With these factors in view, those skilled in the art can select the proper conditions for the production of polyethylene having the desired properties in any particular case.

*Example XXVI*

Several materials were tested as supports for chromium oxide in runs wherein a solution of ethylene in 2,2,4-trimethylpentane was contacted with a fixed bed of catalyst under the conditions shown in the following tables.

The supports for the chromium oxide catalyst were prepared by the following method: (1) the major component was slurried with water in a ball mill for approximately 12 hours; (2) the resulting slurry was then milled together with the nitrate or the oxide of the minor components; (3) the resulting slurry was then milled with ammonium hydroxide; (4) the resulting mixture was dried at 180 to 250° F.; (5) the dried material was calcined at about 900–1000° F.; (6) the calcined material was again milled with water; (7) the resulting mixture was dried; (8) the dried material was calcined; (9) the resulting oxide material was formed into cylindrical pills; and (10) the pills were further calcined. In the case of the catalyst in which the major component of the support was silica, steps 5, 8, 9 and 10 of the foregoing procedure were omitted, and following step 7, the dried powder was extruded, calcined, and steam aged, as previously described herein, in connection with the discussion of the silica-alumina composites. The alumina used in the preparation of the catalyst was a commercial alumina trihydrate. The silica was a commercial silica hydrogel. The zirconia was a commercial high surface zirconia oxide.

Oxide mixtures wherein each of copper oxide, calcium oxide, zinc oxide, manganese trioxide [1], cobalt trioxide, iron trioxide, tin dioxide, titanium dioxide, magnesium oxide, vanadium pentoxide, antimony trioxide, molybdenum trioxide, tungsten trioxide, and nickel oxide, was used as the sole support for the chromium oxide effected substantially no ethylene conversion under the conditions of the runs.

In the following tables, values in parenthesis are estimated values.

[1] $Mn_2O_3$.

TABLE XXXII

[Four-hour fixed-bed polymerization tests at 330° F. maximum temperature, 450 p. s. i. g., and 6 L. H. S. V., 3.0 wt. percent ethylene, 1.2% ethane and 95.8% isooctane (recycled) feed over 100 ml. of pelleted catalyst. Catalysts prepared by impregnation of supports with 0.76 M $CrO_3$ solution and activation at 950° F. with dry air.]

| Catalyst | | | | Polymerization Test | Percent Ethylene Charged Going to— | | | | Isooctane Insoluble Polymer Properties | | | |
|---|---|---|---|---|---|---|---|---|---|---|---|---|
| Support | | Wt. percent Cr | Bulk Density, g/cc. | Average Ethylene Conv., Percent | Unreacted Ethylene | Isooctane Soluble Polymer | Isooctane Insoluble Polymer (Recovered) [1] | Unaccounted For (Catalyst Deposits) [2] | Molecular Weight | Density, at 20° C. | Melting Point, °F. | Falling Ball, Inches |
| Composition | Surface Area, m²/g | | | | | | | | | | | |
| 90% $SiO_2$–10% $Al_2O_3$ | (350) | 2.5 | 0.68 | 97 | 3.3 | 4.2 | 65.6 | 26.9 | 12,600 | 0.955 | 243 | 6 |
| 100% $SiO_2$ | | [3] 2.5 | 0.49 | 93 | 6.8 | 2.7 | 55.0 | 35.5 | 17,000 | 0.952 | 243 | 6 |
| 100% $Al_2O_3$ | | [3] 2.5 | 0.66 | 60 | 40.1 | 1.7 | 28.9 | 29.3 | 15,300 | 0.960 | 245 | [4] BIM |
| 90% $SiO_2$–10% CuO | 263 | 5.7 | 0.41 | 96 | 4.4 | 3.3 | 71.5 | 20.8 | 14,200 | 0.955 | 244 | 6 |
| 90% $SiO_2$–10% CaO | 166 | 5.2 | 0.52 | 91 | 9.0 | 2.9 | 63.7 | 24.4 | 16,400 | 0.951 | 243 | 6 |
| 90% $SiO_2$–10% ZnO | | 5.3 | (0.40) | 96 | 2.8 | 3.3 | 72.5 | 20.4 | 14,400 | 0.953 | 244 | BIM |
| 90% $SiO_2$–10% MgO | 287 | 3.9 | 0.49 | 91 | 9.5 | 2.9 | 65.2 | 22.4 | 22,200 | 0.959 | 246 | 12 |
| 90% $SiO_2$–10% SrO | | 5.8 | 0.40 | 96 | 3.6 | 3.7 | 83.3 | 9.4 | 14,500 | 0.952 | 245 | 6 |
| 90% $SiO_2$–10% BaO | | 5.2 | (0.40) | 93 | 6.8 | 2.9 | 70.8 | 19.5 | 12,100 | 0.952 | 243 | BIM |
| 90% $SiO_2$–10% $B_2O_3$ | | 3.8 | 0.46 | 85 | 15.3 | 3.1 | 60.0 | 21.6 | 11,100 | 0.961 | 246 | BIM |
| 90% $SiO_2$–10% $ThO_2$ | | 4.4 | 0.42 | 79 | 21.1 | 1.5 | 56.5 | 20.9 | 13,700 | 0.960 | 244 | 6 |
| 90% $SiO_2$–10% $WO_3$ | | 3.5 | 0.55 | 95 | 5.0 | 4.0 | 66.7 | 24.3 | 14,300 | 0.958 | 245 | BIM |
| 90% $SiO_2$–10% $Mn_2O_3$ | | 5.2 | 0.40 | 97 | 3.1 | 2.7 | 74.6 | 19.6 | 12,900 | 0.960 | 244 | BIM |
| 90% $SiO_2$–10% $Co_2O_3$ | | 5.0 | 9.45 | 98 | 2.3 | 1.7 | [5] 48.5 | 47.5 | 16,500 | 0.965 | 245 | BIM |
| 90% $SiO_2$–10% $Fe_2O_3$ | | 4.8 | 0.40 | 95 | 4.8 | 2.5 | 71.0 | 21.7 | 14,600 | 0.956 | 246 | BIM |
| 90% $Al_2O_3$–10% CuO | 164 | 2.2 | 0.82 | 10 | 90.5 | 0.2 | 4.8 | 4.5 | 20,600 | | | |
| 90% $Al_2O_3$–10% CaO | 140 | 2.6 | 0.68 | 58 | 42.0 | 1.3 | 23.7 | 33.0 | 16,600 | 0.962 | 246 | 6 |
| 90% $Al_2O_3$–10% ZnO | 138 | 1.6 | 0.85 | 74 | 26.2 | 1.5 | 37.9 | 34.4 | 11,300 | 0.965 | 246 | 6 |
| 90% $Al_2O_3$–10% MgO | 157 | 2.1 | 0.89 | 74 | 26.2 | 2.5 | 37.9 | 33.4 | 14,400 | 0.953 | 245 | 6 |
| 90% $Al_2O_3$–10% SrO | 146 | 2.2 | 0.98 | 75 | 25.4 | 3.3 | 38.1 | 33.2 | 18,100 | 0.954 | 245 | 6 |
| 90% $Al_2O_3$–10% BaO | 154 | 2.2 | 0.89 | 79 | 21.2 | 2.5 | 40.6 | 35.7 | 14,700 | 0.958 | 246 | BIM |
| 90% $Al_2O_3$–10% $B_2O_3$ | 210 | 1.9 | 0.87 | 82 | 18.3 | 1.7 | 35.0 | 45.0 | 21,400 | 0.963 | 247 | 12 |
| 90% $Al_2O_3$–10% $MoO_3$ | 188 | 2.0 | 0.90 | 49 | 51.0 | 1.2 | 13.8 | 34.0 | 12,600 | 0.967 | 247 | BIM |
| 90% $Al_2O_3$–10% $WO_3$ | | 2.0 | 0.86 | 74 | 25.8 | 2.3 | 47.3 | 24.6 | 21,700 | | 246 | 12 |
| 90% $Al_2O_3$–10% $Mn_2O_3$ | 176 | 2.5 | 0.78 | 64 | 35.9 | 1.7 | 29.4 | 33.0 | 13,900 | 0.963 | 245 | BIM |
| 90% $Al_2O_3$–10% $Co_2O_3$ | 160 | 1.9 | 0.93 | 82 | 18.5 | 3.3 | 49.8 | 28.4 | 22,400 | 0.966 | 248 | 18 |
| 90% $Al_2O_3$–10% $Fe_2O_3$ | 166 | 2.6 | 0.76 | 56 | 43.7 | 1.3 | 26.2 | 28.8 | 14,900 | 0.964 | 246 | BIM |

[1] Reactor flushed at end of run with isooctane for one hour at 370° F.
[2] Most of unaccounted for ethylene charged was a heavy polymer which remained on the catalyst.
[3] Strength of impregnation solution adjusted to place 2.5% Cr on catalyst.
[4] BIM—broke in mold.
[5] Reactor outlet plugged at 4 hours on stream. Reactor not flushed.

TABLE XXXIII

[Forty-hour fixed-bed polymerization tests at 330° F. maximum temperatures, 450 p. s. i. g., and 6 L. H. S. V., 3.0 wt. percent ethylene, 0.8–1.2% ethane and 95.8–96.2% isooctane (recycled) feed over 100 ml. of pelleted catalyst. Catalyst prepared by impregnation of supports with 0.76 M $CrO_3$ solution and activation at 950° F. with dry air.]

| Catalyst | | | | Polymerization Test | Percent Ethylene Charged Going to— | | | | Isooctane Insoluble Polymer Properties | | | |
|---|---|---|---|---|---|---|---|---|---|---|---|---|
| Support | | Wt. percent Cr [1] | Bulk Density, g/cc. | Average Ethylene Conv., Percent | Unreacted Ethylene | Isooctane Soluble Polymer | Isooctane Insoluble Polymer (Recovered) | Unaccounted For (Catalyst Deposits) | Molecular Weight | Density, at 20° C. | Melting Point, °F. | Falling Ball, Inches |
| Composition | Surface Area, m²/g | | | | | | | | | | | |
| 90% $SiO_2$-10% $Al_2O_3$ | (350) | 2.5 | 0.60 | 96 | 4.2 | 3.1 | 65.2 | 27.5 | 16,000 | 0.953 | 246 | 6 |
| 100% $SiO_2$ | 725 | 3.0 | 0.55 | [2] 79 | 21.2 | 0.8 | 39.6 | 38.4 | 23,000 | [5] 0.980 | 248 | 18 |
| 100% $Al_2O_3$ | | 2.5 | 0.70 | 63 | 37.5 | 1.7 | 28.8 | 32.0 | 15,900 | 0.963 | 246 | 6 |
| 100% $ThO_2$ | 21 | 0.8 | 1.75 | 83 | 17.0 | 1.7 | 52.1 | 29.2 | 15,400 | 0.964 | 249 | 6 |
| 90% $SiO_2$-10% $Sb_2O_3$ | 314 | 4.6 | 0.41 | 91 | 9.1 | 2.3 | 73.3 | 15.3 | 16,100 | 0.960 | 246 | 6 |
| 90% $SiO_2$-10% $TiO_2$ | 255 | 3.8 | 0.50 | 99 | 1.4 | 2.3 | 64.4 | 31.9 | 14,200 | 0.959 | 247 | BIM |
| 90% $SiO_2$-10% $SnO_2$ | 484 | 2.0 | 0.67 | 91 | 9.4 | 2.9 | 53.3 | 34.4 | 15,400 | 0.961 | 249 | BIM |
| 90% $SiO_2$-10% $V_2O_5$ | 226 | 3.3 | 0.56 | 78 | 21.9 | 3.2 | 43.6 | 31.3 | 11,800 | 0.963 | 247 | BIM |
| 90% $SiO_2$-10% $MoO_3$ | 33 | 4.3 | 0.40 | [3] 41 | 58.8 | 1.0 | 31.2 | 9.0 | 14,000 | 0.959 | 248 | BIM |
| 90% $SiO_2$-10% NiO | 339 | 3.6 | 0.41 | 96 | 4.5 | 2.7 | 58.7 | 34.1 | 19,000 | 0.955 | 247 | 12 |
| 90% $SiO_2$-10% $CeO_2$ | 276 | 4.2 | 0.48 | 89 | 10.8 | 2.1 | 66.0 | 21.1 | 15,600 | 0.959 | 246 | 6 |
| 90% $Al_2O_3$-10% CuO | 156 | 1.9 | 0.87 | 24 | 76.2 | 0.6 | 6.7 | 16.5 | 15,200 | | 249 | |
| 90% $Al_2O_3$-10% $Sb_2O_3$ | 195 | 1.8 | 0.87 | 83 | 17.1 | 1.0 | 41.3 | 40.6 | 15,800 | 0.965 | 247 | 6 |
| 90% $Al_2O_3$-10% $TiO_2$ | 155 | 2.4 | 0.85 | 70 | 30.0 | 1.7 | 37.0 | 31.3 | 14,900 | 0.959 | 249 | 6 |
| 90% $Al_2O_3$-10% $SnO_2$ | 121 | 1.6 | 0.90 | 75 | 25.5 | 1.9 | 54.0 | 18.6 | 15,200 | 0.965 | 248 | BIM |
| 90% $Al_2O_3$-10% $ThO_2$ | 156 | 2.4 | 1.00 | 86 | 14.0 | 2.1 | 46.2 | 37.7 | 16,700 | 0.960 | 246 | 12 |
| 90% $Al_2O_3$-10% $V_2O_5$ | 175 | 2.0 | 0.87 | [4] 26 | 73.6 | 4.8 | | 21.6 | | | | |
| 90% $Al_2O_3$-10% NiO | 175 | 2.2 | 0.90 | 83 | 17.4 | 0.8 | 38.8 | 43.0 | 18,000 | 0.972 | 247 | 12 |
| 90% $Al_2O_3$-10% $CoO_2$ | 162 | 1.8 | 0.82 | 61 | 38.9 | 1.1 | 30.2 | 29.8 | 14,100 | 0.962 | 246 | 6 |
| Platinum Reforming Catalyst (0.4 wt. percent Pt, 0.25 wt. percent F, 0.25 wt. percent Cl, remainder $Al_2O_3$ gel) | 193 | 4.3 | 0.53 | 47 | 53.2 | 1.0 | 12.5 | 33.3 | 9,300 | 0.969 | 248 | 12 |

[1] Calculated from absorption capacity of catalyst.
[2] Catalyst was overheated (475° F.) while in contact with isooctane during start-up.
[3] Catalyst had low surface area.
[4] Two-hour run. Most of the converted ethylene remained on the catalyst.
[5] Contained some catalyst.

TABLE XXXIV

[Fixed-bed polymerization tests at 330° F. maximum temperature, 450 p. s. i. g., and 6 L. H. S. V., 3.0 wt. percent ethylene 1–3% ethane and 94–96% isooctane (recycled) feed over 100 ml. of pelleted catalyst. Catalyst prepared by impregnation of support with 0.76 M $CrO_3$ solution and activation at 950° F. with dry air.]

| Catalyst | | | | Polymerization Test | | Percent Ethylene Charged Going to— | | | | Isooctane Insoluble Polymer Properties | | | |
|---|---|---|---|---|---|---|---|---|---|---|---|---|---|
| Support | | Wt. percent Cr | Bulk Density g/cc | Length of Test, Hours | Average Ethylene Conv., percent | Unreacted Ethylene | Isooctane Soluble Polymer | Isooctane Insoluble Polymer (Recovered) | Unaccounted for (Catalyst Deposit) | Molecular Weight | Density at 20° C. | Melting Point, °F. | Falling Ball, Inches |
| Composition | Surface Area, M²/g | | | | | | | | | | | | |
| 90% $ZrO_2$-10% CuO | 6 | 0.6 | 1.73 | 2 | 7 | | | | | | | | |
| 90% $ZrO_2$-10% CaO | 6 | 0.6 | 1.69 | 2 | 8 | | | | | | | | |
| 90% $ZrO_2$-10% ZnO | 5 | (0.6) | 2.23 | 4 | 10 | | | | | | | | |
| 90% $ZrO_2$-10% MgO | 12 | 0.4 | 2.39 | 4 | 26 | 74.3 | 0.5 | 10.8 | 14.4 | 13,200 | 0.959 | 247 | BIM |
| 90% $ZrO_2$-10% SrO | 6 | 0.6 | 1.66 | 2 | 8 | | | | | | | | |
| 90% $ZrO_2$-10% $Sb_2O_3$ | 6 | 0.5 | 1.71 | 2 | 7 | | | | | | | | |
| 90% $ZrO_2$-10% BaO | 8 | 0.6 | 1.94 | 2 | 58 | 42.0 | 0.2 | 33.8 | 24.0 | 16,700 | 0.963 | 246 | 6 |
| 90% $ZrO_2$-10% $B_2O_3$ | 2 | 0.9 | 1.35 | 4 | 5 | | | | | | | | |
| 90% $ZrO_2$-10% $TiO_2$ | 13 | 0.7 | 1.69 | 4 | 16 | 84.0 | 0.4 | 7.7 | 7.9 | 10,400 | 0.974 | 247 | BIM |
| 90% $ZrO_2$-10% $SnO_2$ | 5 | 0.7 | 1.65 | 4 | 15 | | | | | | | | |
| 90% $ZrO_2$-10% $ThO_2$ | 9 | 0.6 | 1.88 | 4 | 21 | 79.0 | 0.4 | 7.5 | 13.1 | 10,600 | 0.969 | 244 | BIM |
| 90% $ZrO_2$-10% $V_2O_5$ | 4 | 0.6 | 1.78 | 2 | 11 | | | | | | | | |
| 90% $ZrO_2$-10% $MoO_3$ | 3 | 0.6 | 1.95 | 2 | 5 | | | | | | | | |
| 90% $ZrO_2$-10% $WO_3$ | 6 | 0.6 | 1.92 | 4 | 7 | | | | | | | | |
| 90% $ZrO_2$-10% $Mn_2O_3$ | 7 | 1.1 | 1.77 | 2 | 12 | | | | | | | | |
| 90% $ZrO_2$-10% $Co_2O_3$ | 10 | 0.5 | 1.94 | 4 | 38 | 62.0 | 0.6 | 17.3 | 20.1 | 9,800 | 0.970 | 245 | BIM |
| 90% $ZrO_2$-10% $Fe_2O_3$ | 8 | 0.7 | 1.80 | 4 | 17 | | | | | | | | |
| 90% $ZrO_2$-10% NiO | 10 | 0.6 | 1.60 | 4 | 17 | 83.5 | 0.4 | 9.0 | 7.1 | 9,400 | 0.970 | 244 | BIM |
| 90% $ZrO_2$-10% $CeO_2$ | 14 | 0.7 | 1.82 | 4 | 20 | 80.0 | 0.5 | 9.9 | 9.6 | 12,100 | 0.965 | 242 | BIM |
| 100% $ZrO_2$ | 10 | 0.5 | 1.95 | 4 | 24 | 76.0 | 0.4 | 11.3 | 12.3 | 8,600 | 0.968 | 244 | |
| 100% $ZrO_2$ | 35 | 0.3 | 1.90 | 4 | 45 | 55.0 | 0.4 | 28.3 | 16.3 | 13,600 | 9.966 | 248 | BIM |
| 90% $SiO_2$-10% $Al_2O_3$ | 574 | 3.9 | 0.55 | 4 | 95 | 4.8 | 3.9 | 63.8 | 27.5 | 14,100 | 0.953 | 245 | 6 |
| 90% $Al_2O_3$-10% $SiO_2$ | 263 | 2.5 | 0.76 | 4 | 97 | 2.9 | 1.6 | 73.4 | 22.1 | 16,400 | 0.951 | 243 | BIM |
| Activated Carbon [1] | 536 | 0.5 | 0.38 | 4 | 64 | 36.0 | 2.3 | 13.5 | 48.2 | 6,800 | 0.957 | 240 | BIM |

[1] Contained 13% silica and 5% alumina as impurities.

TABLE XXXV

[Fixed-bed polymerization tests at 330° F. maximum temperature, 450 p. s. i. g., and 6 L. H. S. V., 3.0 wt. percent ethylene, 3% ethane, and 94% isooctane (recycled) feed over 100 ml. of pelleted catalyst. Catalyst prepared by impregnation of support with 0.76 M $CrO_3$ solution and activation with dry air at 950° F.]

| Catalyst | | | | Polymerization Test | | Percent Ethylene Charged Going to— | | | | Isooctane Insoluble Polymer Properties | | | |
|---|---|---|---|---|---|---|---|---|---|---|---|---|---|
| Support | | | | | | | | | | | | | |
| Composition | Surface Area, $M^2/g$ | Wt. percent Cr | Bulk Density g/cc | Length of Test, Hours | Average Ethylene Conv., percent | Unreacted Ethylene | Isooctane Soluble Polymer | Isooctane Insoluble Polymer (Recovered) | Unaccounted for (Catalyst Deposit) | Molecular Weight | Density at 20° C. | Melting Point, °F. | Falling Ball, Inches |
| 90% $SiO_2$-10% $Al_2O_3$ | | 2.5 | 0.61 | 4 | 91 | 8.6 | 3.5 | 66.4 | 21.5 | 13,300 | 0.953 | 247 | |
| 100% $ThO_2$ | 21 | 0.8 | 1.75 | 4 | 83 | 17.0 | 1.7 | 52.1 | 29.2 | 15,400 | 0.964 | 249 | 6 |
| 90% $ThO_2$-10% CuO | 55 | 0.6 | 2.29 | 2 | 6 | | | | | | | | |
| 90% $ThO_2$-10% CaO | 56 | 0.6 | 2.25 | 4 | 34 | 65.9 | 0.6 | 19.8 | 13.7 | 7,400 | 0.963 | 245 | BIM |
| 90% $ThO_2$-10% ZnO | 70 | 0.6 | 2.40 | 4 | 27 | 72.8 | 1.2 | 8.8 | 17.2 | 12,200 | 0.958 | 245 | BIM |
| 90% $ThO_2$-10% MgO | 71 | 0.6 | 2.24 | 4 | 16 | | | | | | | | |
| 90% $ThO_2$-10% SrO | 50 | 0.5 | 2.37 | 4 | 25 | 75.4 | 0.2 | 4.0 | 20.4 | 8,100 | 0.969 | 249 | |
| 90% $ThO_2$-10% $Sb_2O_3$ | 60 | 0.6 | 2.02 | 4 | 19 | 81.2 | 0.4 | 2.1 | 16.3 | 8,100 | 0.981 | 248 | |
| 90% $ThO_2$-10% BaO | 52 | 0.4 | 2.35 | 4 | 28 | 72.1 | 0.2 | 4.2 | 23.5 | 8,200 | 0.971 | 247 | BIM |
| 90% $ThO_2$-10% $B_2O_3$ | 40 | 0.5 | 2.01 | 4 | 22 | 78.1 | 0.8 | 15.0 | 6.1 | 9,000 | 0.973 | 248 | |
| 90% $ThO_2$-10% $TiO_2$ | 64 | 0.8 | 1.95 | 4 | 60 | 40.0 | 1.2 | 33.4 | 25.4 | 10,200 | 0.967 | 249 | BIM |
| 90% $ThO_2$-10% $SnO_2$ | 67 | 0.8 | 1.87 | 4 | 64 | 36.2 | 0.6 | 30.8 | 32.4 | 12,200 | 0.966 | 248 | 6 |
| 90% $ThO_2$-10% $V_2O_5$ | 36 | 0.7 | 2.06 | 4 | 4 | | | | | | | | |
| 90% $ThO_2$-10% $MoO_3$ | 74 | 0.7 | 2.34 | 4 | 83 | 36.8 | 1.9 | 40.8 | 20.5 | 19,700 | 0.965 | 248 | 6 |
| 90% $ThO_2$-10% $WO_3$ | 54 | 0.7 | 2.09 | 2 | 11 | | | | | | | | |
| 90% $ThO_2$-10% $Mn_2O_3$ | 63 | 0.6 | 2.06 | 2 | 9 | | | | | | | | |
| 90% $ThO_2$-10% $Co_2O_3$ | 56 | 0.6 | 2.19 | 4 | 63 | 37.3 | 0.6 | 35.6 | 26.5 | 19,800 | 0.965 | 249 | 12 |
| 90% $ThO_2$-10% $Fe_2O_3$ | 84 | 0.7 | 1.88 | 4 | 32 | 68.0 | 0.4 | 17.3 | 14.3 | 9,800 | 0.967 | 246 | BIM |
| 90% $ThO_2$-10% NiO | 74 | 0.6 | 2.22 | 4 | 58 | 42.3 | 0.4 | 30.4 | 26.9 | 22,200 | 0.959 | 251 | |
| 90% $ThO_2$-10% $CeO_2$ | 63 | 0.6 | 2.06 | 4 | 41 | 58.8 | 0.8 | 23.7 | 16.7 | 17,700 | 0.965 | 250 | 6 |

The foregoing data show that silica, alumina, thoria and zirconia are particularly desirable as supports for a chromium oxide catalyst according to this invention. It will be recognized by those skilled in the art that the term "support," as used herein, is not limited to inactive materials. Indeed, the foregoing data show that there are oxides which, when mixed with chromium oxide, do not form an active catalyst for the purposes of this invention, and that others, notably silica, alumina, zirconia, and thoria, contribute or enhance catalytic activity.

It will also be noted that the activity of a catalyst can be varied by the use of additional oxides in admixture with the silica, alumina, zirconia and/or thoria. It will be further noted that a given auxiliary oxide in the support increases the activity in the presence of certain of the main support components and does not in the presence of others. Thus, copper oxide, zinc oxide, strontium oxide, tungsten oxide, manganese trioxide, cobalt trioxide and iron trioxide increased the activity of the catalyst in which silica was the sole support. Zinc oxide, magnesium oxide, strontium oxide, barium oxide, boron oxide, tungsten oxide, manganese trioxide and cobalt trioxide increased the activity of the alumina-base catalyst. Barium oxide increased the activity of the zirconia-base catalyst, and none of the additional oxide supports tested together with thoria produced any increase in the activity of the catalyst. From the foregoing data, those skilled in the art can select catalysts having the desired activity for a desired application. Strontium oxide confers special properties on the catalyst, as more fully set forth in our copending application Serial No. 433,804, filed June 1, 1954.

*Example XXVII*

Effects of reaction pressure on reaction rate and on certain polymer properties in the polymerization of ethylene according to our process are shown in Table XXXVI. The data were obtained in two-hour runs in a one-liter, batch-type, stirred reactor at 285° F. Purified cyclohexane was utilized as a diluent. The catalyst contained 2.5 weight percent chromium as oxide deposited on a commercial microspheroidal silica-alumina and had been activated by heating in dry air (dew point below 0° F.) at 950° F. for five hours. The silica:alumina weight ratio in the catalyst was approximately 8:1.

TABLE XXXVI

| Reaction Pressure, p. s. i. g. | Cat. Conc. in Solvent, wt. percent | Reaction Rate, g./g./hr. | Mol. Wt. from Inherent Viscosity | Melt Index | Izod Impact ¼ x ½ bar |
|---|---|---|---|---|---|
| 100 | 0.39 | 13 | 34,300 | 2.8 | 0.9 |
| 200 | 0.23 | 83 | 39,000 | 1.4 | 2.3 |
| 300 | 0.15 | 220 | 38,300 | 0.72 | 4.8 |
| 450 | 0.06 | 440 | 45,600 | 0.59 | 7.2 |
| 700 | 0.07 | 320 | 46,500 | 0.46 | 9.5 |
| 800 | 0.07 | 450 | 48,900 | 0.38 | 11.1 |
| 900 | 0.06 | 340 | 49,000 | 0.41 | 9.5 |

The above reaction rates are in terms of grams of polymer produced per gram of catalyst per hour.

The data show that reaction rate increased with pressure up to 450 p. s. i. g. Above this pressure, the reaction rate data were erratic, probably because of the low catalyst concentrations utilized. The catalyst concentrations at the higher pressures were maintained low in this particular group of runs in order to facilitate the removal of the liberated heat, which was relatively high at the high pressures. The data also illustrate the fact that at a constant temperature and in the presence of a particular catalyst, increased pressure results in increased molecular weight.

The density and the melting point of the polyethylenes were substantially unaffected by pressure change within the range shown in Table XXXVI.

From the foregoing, it will be seen that pressures as high as 1000 p. s. i. can be satisfactorily used in our process. Pressures of from 700 up to as high as 2000 p. s. i. or higher can be used if desired. However, as a a general rule, pressures above 1000 p. s. i. are not essential for the obtainment of satisfactory results.

Water, oxygen, carbon monoxide, and most compounds of sulfur, of oxygen, of nitrogen, and of halogens act as poisons for the catalysts of this invention. Therefore the concentration of these materials in the feed should not exceed 1000 parts per million and preferably should not exceed 100 parts per million. More preferably, they should be entirely excluded. Water can be removed by lowering the dew point of the feed gas, for example, to 0° F. or lower, by refrigeration or by contact with a dehydrating agent, such as silica gel. Oxygen can be removed by adsorption or by reaction with a metal such as copper. Carbon monoxide can be removed by absorption or selective oxidation. The diluent can be purified by hydrogenation or fractionation. The above removal methods are well known in the art.

Catalyst regeneration gas or activation gas should be non-reducing and, preferably, free from sulfur and halogen as well as from nitrogen compounds. From 1 to 25 weight percent oxygen can be present in the regeneration gas, and up to 100 percent in the activation gas. Compounds which form carbonaceous deposits should be absent.

As will be evident to those skilled in the art, many variations and modifications can be practiced within the scope of the disclosure and claims to this invention. The invention resides in a process, a novel class of polymers, and a novel catalyst and method of preparation thereof, the process comprising polymerizing an aliphatic olefin of the type described by contacting with a catalyst comprising, as the essential catalytic constituents, chromium oxide, including hexavalent chromium, and at least one oxide selected from the group consisting of silica, alumina, thoria, and zirconia.

We claim:

1. A process which comprises polymerizing at least one polymerizable olefin, at a polymerization temperature up to about 500° F., with a catalyst active for such polymerization and comprising, as the sole essential effective catalytic ingredients thereof, chromium oxide and at least one material selected from the group consisting of silica, alumina, zirconia, and thoria, at least part of the chromium being in the hexavalent state at the initial contacting of hydrocarbon with said catalyst.

2. A process which comprises polymerizing at least one aliphatic 1-olefin having from 2 to 8 carbon atoms per molecule and no chain branching nearer the double bond than the 4-position, at a polymerization temperature in the range 100 to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with said catalyst.

3. A process which comprises polymerizing at least one aliphatic 1-olefin having from 2 to 8 carbon atoms per molecule and no chain branching nearer the double bond than the 4-position, in the gas phase, at a polymerization temperature in the range 100 to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with said catalyst.

4. A process which comprises polymerizing at least one aliphatic 1-olefin having from 2 to 8 carbon atoms per molecule and no chain branching nearer the double bond than the 4-position, at a polymerization temperature in the range 100 to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with said catalyst, the catalyst being maintained in suspension in the reaction mixture during the polymerization.

5. A process which comprises polymerizing at least one aliphatic 1-olefin having from 2 to 8 carbon atoms per molecule and no branching nearer the double bond than the 4-position, at a polymerization temperature in the range 150 to 450° F., with a catalyst active for such polymerization and comprising, as the sole essential effective catalytic ingredients thereof, chromium oxide supported on alumina, at least 0.1 weight percent of the total catalyst being chromium in the hexavalent state at the initial contacting of hydrocarbon with said catalyst.

6. A process which comprises polymerizing at least one aliphatic 1-olefin having from 2 to 8 carbon atoms per molecule and no branching nearer the double bond than the 4-position, in the gas phase, at a polymerization temperature in the range 150 to 450° F., with a catalyst active for such polymerization and comprising, as the sole essential effective catalytic ingredients thereof, chromium oxide supported on alumina, at least 0.1 weight percent of the total catalyst being chromium in the hexavalent state at the initial contacting of hydrocarbon with said catalyst.

7. A process which comprises polymerizing at least one aliphatic 1-olefin having from 2 to 8 carbon atoms per molecule and no branching nearer the double bond than the 4-position, at a polymerization temperature in the range 150 to 450° F., with a catalyst active for such polymerization and comprising, as the sole essential effective catalytic ingredients thereof, chromium oxide supported on silica-alumina, at least 0.1 weight percent of the total catalyst being chromium in the hexavalent state at the initial contacting of hydrocarbon with said catalyst.

8. A process which comprises polymerizing at least one aliphatic 1-olefin having from 2 to 8 carbon atoms per molecule and no branching nearer the double bond than the 4-position, in the gas phase, at a polymerization temperature in the range 150 to 450° F., with a catalyst active for such polymerization and comprising, as the sole essential effective catalytic ingredients thereof, chromium oxide supported on silica-alumina, at least 0.1 weight percent of the total catalyst being chromium in the hexavalent state at the initial contacting of hydrocarbon with said catalyst.

9. A process which comprises polymerizing at least one aliphatic 1-olefin having from 2 to 8 carbon atoms per molecule and no branching nearer the double bond than the 4-position, at a polymerization temperature in the range 150 to 450° F., with a catalyst active for such polymerization and comprising, as the sole essential effective catalytic ingredients thereof, chromium oxide supported on silica-alumina, at least 0.1 weight percent of the total catalyst being chromium in the hexavalent state at the initial contacting of hydrocarbon with said catalyst, the catalyst being maintained in suspension in the reaction mixture during polymerization.

10. A process which comprises polymerizing at least one aliphatic 1-olefin having from 2 to 8 carbon atoms per molecule and no branching nearer the double bond than the 4-position, at a polymerization temperature in the range 150 to 450° F., with a catalyst active for such polymerization and comprising, as the sole essential effective catalytic ingredients thereof, chromium oxide supported on silica, at least 0.1 weight percent of the total catalyst being chromium in the hexavalent state at the initial contacting of hydrocarbon with said catalyst.

11. A process which comprises polymerizing at least one aliphatic 1-olefin having from 2 to 8 carbon atoms per molecule and no branching nearer the double bond than the 4-position, in the gas phase, at a polymerization temperature in the range 150 to 450° F., with a catalyst active for such polymerization and comprising, as the sole essential effective catalytic ingredients thereof, chromium oxide supported on silica, at least 0.1 weight percent of the total catalyst being chromium in the hexavalent state at the initial contacting of hydrocarbon with said catalyst.

12. A process which comprises polymerizing at least one olefin selected from the group consisting of ethylene, propylene, 1-butene, 1-pentene, 1-hexene, 1-heptene, 1-octene, 4-methyl-1-pentene, butadiene, and isoprene at a polymerization temperature in the range 150 to 375° F. with a catalyst consisting essentially of chromium oxide supported on alumina, said catalyst containing at least 0.1 weight percent hexavalent chromium at the initial contacting of hydrocarbon with said catalyst, and recovering a resulting solid polymer.

13. A process which comprises polymerizing at least one olefin selected from the group consisting of ethylene, propylene, 1-butene, 1-pentene, 1-hexene, 1-heptene, 1-octene, 4-methyl-1-pentene, butadiene, and isoprene at a polymerization temperature in the range 150 to 375° F. with a catalyst consisting essentially of chromium oxide supported on silica-alumina, said catalyst containing at least 0.1 weight percent hexavalent chromium at the initial contacting of hydrocarbon with said catalyst, and recovering a resulting solid polymer.

14. A process which comprises polymerizing at least one olefin selected from the group consisting of ethylene, propylene, 1-butene, 1-pentene, 1-hexene, 1-heptene, 1-octene, 4-methyl-1-pentene, butadiene, and isoprene at a polymerization temperature in the range 150 to 375° F. with a catalyst consisting essentially of chromium oxide supported on silica, said catalyst containing at least 0.1 weight percent hexavalent chromium at the initial contacting of hydrocarbon with said catalyst and recovering a resulting solid polymer.

15. A process which comprises polymerizing ethylene at a polymerization temperature in the range 275 to 375° F. with a catalyst comprising, as the sole essential effective catalytic ingredients thereof, chromium oxide supported on silica-alumina, said catalyst containing at least 0.1 weight percent hexavalent chromium at the initial contacting of the hydrocarbon with said catalyst, and recovering a solid polymer.

16. A process which comprises polymerizing propylene at a polymerization temperature in the range 150 to 250° F. with a catalyst comprising, as the sole essential effective catalytic ingredients thereof, chromium oxide supported on silica-alumina, said catalyst containing at least 0.1 weight percent hexavalent chromium at the initial contacting of hydrocarbon with said catalyst, and recovering a resulting solid polymer.

17. A process which comprises copolymerizing ethylene and propylene, at a polymerization temperature in the range 150 to 375° F., with a catalyst comprising, as the sole essential effective catalytic ingredients thereof, chromium oxide supported on silica-alumina, said catalyst containing at least 0.1 weight percent hexavalent chromium at the initial contacting of hydrocarbon with said catalyst, and recovering a resulting solid copolymer.

18. A process which comprises copolymerizing ethylene and 1-butene, at a polymerization temperature in the range 150 to 375° F., with a catalyst comprising, as the sole essential effective catalytic ingredients thereof, chromium oxide supported on silica-alumina, said catalyst containing at least 0.1 weight percent hexavalent chromium at the initial contacting of hydrocarbon with said catalyst, and recovering a resulting solid copolymer.

19. A process which comprises polymerizing a diolefin, at a polymerization temperature in the range 150 to 250° F., with a catalyst comprising, as the sole essential effective catalytic ingredients thereof, chromium oxide supported on silica-alumina, said catalyst containing at least 0.1 weight percent hexavalent chromium at the initial contacting of hydrocarbon with said catalyst, and recovering a resulting solid polymer.

20. A process which comprises polymerizing ethylene, at a polymerization temperature in the range 100 to 450° F., with a catalyst active for such polymerization and consisting essentially of chromium oxide supported on at least one material selected from the group consisting of silica, alumina, zirconia and thoria, at least part of the chromium being in the hexavalent state at the initial contacting of hydrocarbon with said catalyst, and recovering a resulting solid polymer.

21. A process which comprises polymerizing at least one aliphatic 1-olefin having from 2 to 8 carbon atoms per molecule and no branching nearer the double bond than the 4-position, at a polymerization temperature in the range 100 to 450° F., with a catalyst comprising, as the sole essential effective catalytic ingredients thereof, chromium oxide supported on alumina, said catalyst having been heated under elevated temperature for a sufficient time to activate said catalyst for said process and leave at least part of the chromium in the hexavalent state, and recovering a resulting solid polymer.

22. A process which comprises polymerizing at least one aliphatic 1-olefin having from 2 to 8 carbon atoms per molecule and no branching nearer the double bond than the 4-position, at a polymerization temperature in the range 100 to 450° F., with a catalyst comprising, as the sole essential effective catalytic ingredients thereof, chromium oxide supported on silica-alumina, said catalyst having been heated under elevated temperature for a sufficient time to activate said catalyst for said process and leave at least part of the chromium in the hexavalent state, and recovering a resulting solid polymer.

23. A process according to claim 22 wherein said catalyst is in the form of a fixed bed and the space velocity is in the range 0.1 to 20 liquid volumes of feed per volume of catalyst per hour.

24. A process which comprises polymerizing at least one aliphatic 1-olefin having from 2 to 8 carbon atoms per molecule and no branching nearer the double bond than the 4-position, at a polymerization temperature in the range 100 to 450° F., with a catalyst comprising, as the sole essential effective catalytic ingredients thereof, chromium oxide supported on silica, said catalyst having been heated under elevated temperature for a sufficient time to activate said catalyst for said process and leave at least part of the chromium in the hexavalent state, and recovering a resulting solid polymer.

25. A process which comprises polymerizing ethylene at a polymerization temperature in the range 150 to 450° F., with a catalyst consisting essentially of chromium oxide supported on at least one member of the group consisting of silica, alumina, zirconia and thoria, said catalyst having been activated by heating at an elevated temperature for a sufficient time to activate said catalyst for said process and result in at least part of the chromium being in the hexavalent state, and recovering a resulting solid polymer.

26. A process which comprises polymerizing at least one olefin selected from the group consisting of ethylene, propylene, 1-butene, 1-pentene, 1-hexene, 1-heptene, 1-octene, 4-methyl-1-pentene, butadiene and isoprene at a temperature in the range 150 to 450° F. with a catalyst comprising, as the sole essential effective catalytic ingredients thereof, chromium oxide supported on silica-alumina, said catalyst having been activated by heating at a temperature in the range 750 to 1500° F. in a nonreducing atmosphere for a time sufficient to activate said catalyst for said process and leave at least part of the chromium in the hexavalent state, and recovering a resulting solid polymer.

27. A process which comprises polymerizing at least one olefin selected from the group consisting of ethylene, propylene, 1-butene, 1-pentene, 1-hexene, 1-heptene, 1-octene, 4-methyl-1-pentene, butadiene and isoprene at a temperature in the range 150 to 450° F., with a catalyst comprising, as the sole essential effective catalytic ingredients thereof, chromium oxide supported on silica-alumina, said catalyst having been activated by heating at a temperature in the range 750 to 1500° F. in an anhydrous, nonreducing atmosphere for a time sufficient to activate said catalyst for said process and leave at least part of the chromium in the hexavalent state, and recovering a resulting solid polymer.

28. A process which comprises polymerizing at least one olefin selected from the group consisting of ethylene, propylene, 1-butene, 1-pentene, 1-hexene, 1-heptene, 1-octene, 4-methyl-1-pentene, butadiene and isoprene at a temperature in the range 150 to 450° F. with a catalyst comprising, as the sole essential effective catalytic ingredients thereof, chromium oxide supported on alumina, said catalyst having been activated by heating at a temperature in the range 750 to 1500° F. in an anhydrous, oxygen-containing atmosphere for a time sufficient to activate said catalyst for said process and leave at least part of the chromium in the hexavalent state, and recovering a resulting solid polymer.

29. A process which comprises polymerizing at least one olefin selected from the group consisting of ethylene, propylene, 1-butene, 1-pentene, 1-hexene, 1-heptene, 1-octene, 4-methyl-1-pentene, butadiene and isoprene at a temperature in the range 150 to 450° F. with a catalyst comprising, as the sole essential effective catalytic ingredients thereof, chromium oxide supported on silica-alumina, said catalyst having been activated by heating at a temperature in the range 750 to 1500° F. in an anhydrous, oxygen-containing atmosphere for a time sufficient to activate said catalyst for said process and leave at least part of the chromium in the hexavalent state, and recovering a resulting solid polymer.

30. A process according to claim 29 wherein the time for the activation is from 3 to 10 hours, and the activated catalyst contains at least 0.1 weight percent chromium in the hexavalent state.

31. A process which comprises polymerizing at least one olefin selected from the group consisting of ethylene, propylene, 1-butene, 1-pentene, 1-hexene, 1-heptene, 1-octene 4-methyl-1-pentene, butadiene and isoprene at a temperature in the range 150 to 450° F., with a catalyst comprising, as the sole essential effective catalytic ingredients thereof, chromium oxide supported on silica, said catalyst having been activated by heating at a temperature in the range 750 to 1500° F. in an anhydrous, oxygen-containing atmosphere for a time sufficient to activate said catalyst for said process and leave at least part of the chromium in the hexavalent state, and recovering a resulting solid polymer.

32. A polymerization process which comprises contacting at least one aliphatic 1-olefin having from 2 to 8 carbon atoms per molecule and no chain branching nearer the double bond than the 4-position at a polymerization temperature in the range 100 to 450° F., with a catalyst consisting essentially of the product resulting from depositing a chromium compound calcinable to chromium oxide on a silica-alumina support and heating the resulting composite in a substantially anhydrous oxygen-containing gas at a temperature in the range 750 to 1500° F. for from about 3 to about 10 hours, and recovering a resulting solid polymer.

33. A polymerization process which comprises contacting at least one olefin selected from the group consisting of ethylene, propylene, 1-butene, 1-pentene, 1-hexene, 1-heptene, 1-octene, 4-methyl-1-pentene, butadiene, and isoprene, at a polymerization temperature in the range 150 to 450° F., with a catalyst consisting of the product resulting from depositing a chromium compound calcinable to chromium oxide on a silica-alumina support and heating the resulting composite in a substantially anhydrous oxygen-containing atmosphere at a temperature within the range 750 to 1300° F. for from 3 to 10 hours, and recovering a resulting solid polymer.

34. A process which comprises polymerizing at least one aliphatic 1-olefin having from 2 to 8 carbon atoms per molecule and no chain branching nearer the double bond than the 4-position, in admixture with a hydrocarbon solvent which is inert and liquid under the polymerization conditions, at a polymerization temperature in the range 100 to 450° F., with a catalyst active for such polymerization and comprising, as the sole essential effective catalytic ingredients thereof, chromium oxide supported on at least one support component selected from the group consisting of silica, alumina, zirconia, and thoria, at least part of the chromium being in the hexavalent state at the initial contacting of hydrocarbon with catalyst.

35. A process according to claim 34 wherein said hydrocarbon solvent is a paraffinic hydrocarbon having from 3 to 12 carbon atoms per molecule.

36. A process according to claim 34 wherein said hydrocarbon solvent is a cycloparaffin.

37. The process which comprises polymerizing ethylene, in admixture with a hydrocarbon solvent which is inert and liquid under the reaction conditions, at a polymerization temperature in the range 150 to 450° F., with a catalyst active for such polymerization and comprising, as the sole essential effective catalytic ingredients thereof, chromium oxide supported on silica-alumina, at least part of the chromium in the catalyst being in the hexavalent state at the initial contacting of hydrocarbon with catalyst, and recovering a resulting solid polymer.

38. A polymerization process which comprises contacting at least one olefin selected from the group consisting of ethylene, propylene, 1-butene, 1-pentene, 1-hexene, 1-heptene, 1-octene, 4-methyl-1-pentene, butadiene, and isoprene, in admixture with a hydrocarbon solvent which is liquid and inert under the contacting conditions, at a temperature in the range 150 to 450° F. and a pressure sufficient to maintain said solvent substantially in the liquid phase, with a catalyst consisting of the product resulting from impregnating a silica-alumina support with an aqueous solution of a chromium compound calcinable to chromium oxide, drying the impregnated solid, and heating in a substantially anhydrous oxygen-containing gas at a temperature in the range 750 to 1300° F. for a period of time in the range 3 to 10 hours, at least part of the chromium being in the hexavalent state at the initial contacting with hydrocarbon, and recovering a resulting solid polymer.

39. A process according to claim 38 wherein the total chromium content of said catalyst is in the range 0.1 to 10 weight percent and the hexavalent chromium content of said catalyst is at least 0.1 weight percent.

40. The process of claim 38 in which silica is a major ingredient of the support.

41. A process for polymerizing ethylene to solid polymer in admixture with a hydrocarbon diluent which is inert and liquid under the reaction conditions of the process which comprises contacting the mixture in liquid phase at a temperature in the range of 150 to 450° F. with a chromium oxide-silica-alumina catalyst composite having a chromium content in the range 0.1 to 10 weight percent and consisting of the product resulting from a process comprising impregnating a silica-alumina complex with an aqueous solution of a chromium compound convertible to chromium oxide upon heating, calcining the impregnated silica-alumina in dry air at a temperature in the range of 750 to 1500° F. to convert said compound to chromium oxide in which chromium in hexavalent form constitutes at least 0.1 weight percent of the total catalyst, and recovering a resulting solid polymer.

42. The process of claim 41 in which said solution of a chromium compound is an aqueous solution of $CrO_3$.

43. A process which comprises polymerizing at least one aliphatic 1-olefin having a maximum of 8 carbon atoms and no branching nearer the double bond than the 4-position with a catalyst comprising chromium oxide deposited on at least one porous solid selected from the group consisting of silica, alumina, zirconia and thoria, at least part of the chromium being in the hexavalent state at the initial contacting of olefin with catalyst, at a temperature in the range of 150 to 350° F. so as to produce a polymer comprising a liquid fraction, a tacky fraction and a solid fraction, subjecting the total polymer to extraction with pentane at room temperature so as to leave a solid insoluble fraction, extracting the pentane-soluble material at least once with methylisobutylketone at room temperature so as to obtain an extract of normally liquid oil and a raffinate of tacky polymer.

44. A process which comprises polymerizing at least one aliphatic 1-olefin having a maximum of 8 carbon atoms and no branching nearer the double bond than the 4-position, in the liquid phase, with a catalyst comprising chromium oxide deposited on a support selected from the group consisting of silica, alumina, zirconia, and thoria, at least part of the chromium being in the hexavalent state at the initial contacting of olefin with catalyst at a temperature in the range of 150 to 350° F. so as to produce a polymer comprising a liquid fraction, a tacky fraction and a solid fraction, fractionating the total polymer to produce an overhead fraction having an end point in the range 850° F. to 900° F. at atmospheric pressure, extracting the bottoms fraction with methylisobutylketone so as to recover tacky polymer as extract and recover, as raffinate, solid polymer.

References Cited in the file of this patent

UNITED STATES PATENTS

| | | |
|---|---|---|
| 2,332,276 | Stahly | Oct. 19, 1943 |
| 2,692,257 | Zletz | Oct. 19, 1954 |
| 2,721,189 | Anderson et al. | Oct. 18, 1955 |
| 2,726,231 | Field et al. | Dec. 6, 1955 |

OTHER REFERENCES

Hahn et al.: "Ind. and Eng. Chem.," vol. 37, June 1945, pages 526–533.

Neumann et al.: "Modern Plastics," vol. 32, pages 117–120, 122, August 1955.

UNITED STATES PATENT OFFICE

CERTIFICATE OF CORRECTION

Patent No. 2,825,721                                                     March 4, 1958

John Paul Hogan et al.

It is hereby certified that error appears in the printed specification of the above numbered patent requiring correction and that the said Letters Patent should read as corrected below.

Column 3, line 4, for "peper" read --paper--; column 5, line 53, for "substantially" read --subsequently--; line 59, for "perssure" read --pressure--; column 7, line 43, for "zone with" read --zone,--; column 9, line 61, for "propoylene-ethylene" read --propylene-ethylene--; column 11, line 8, for "witht" read --with--; line 56, for "1-olefins" read --1-monoolefins--; column 12, line 41, Table IV, in the heading, for "$C_3H_8$" read --$C_3H_6$--; column 16, line 25, for "chroium" read --chromium--; columns 21 and 22, Table XIV, right-hand sub heading under "Polymerization Tests" for "Propy ene" read --Propylene--; same table, left-hand sub heading under "Polymer Analysis", for "850° F." read --850° F.¯--; column 24, line 6, for "ploymer" read --polymer--; column 26, line 2, for "subject" read --subjected--; columns 31 and 32, Table XXV-A, fourth column, in heading thereto, after "Unsaturation" insert a comma; column 33, line 2, for "carbonhydrogen" read --carbon-hydrogen--; lines 21 and 22, for "indicate" read --indicated--; line 41, for "in the" read --in--; column 34, line 33, for "grom" read --from--; line 46, for "polymer" read --copolymer--; column 36, line 65, for "stepp" read --step--; column 38, line 2, for "ethylene" read --ethylenes--; column 40, line 29, strike out "oxide"; columns 41 and 42, Table XXXIII, in the legend above the table, first line thereof, for "Forty-hour" read --Four-hour--; same columns 41 and 42, Table XXXIV, twelfth column thereof, fourth item from the bottom, for "9.966" read --0.966--; column 49, line 29, after "octene" insert a comma.

Signed and sealed this 3rd day of June 1958.

(SEAL)
Attest:

KARL H. AXLINE                                                ROBERT C. WATSON

Attesting Officer                                            Commissioner of Patents